United States Patent
Mattes et al.

(10) Patent No.: US 11,906,945 B2
(45) Date of Patent: Feb. 20, 2024

(54) METHOD AND DEVICE FOR GENERATING CONTROL DATA FOR AN ADDITIVE MANUFACTURING DEVICE

(71) Applicant: EOS GmbH Electro Optical Systems, Krailling (DE)

(72) Inventors: Thomas Mattes, Gilching (DE); Peter Holfelder, Neufahrn bei Freising (DE); Anoush Aghajani-Talesh, Germering (DE)

(73) Assignee: EOS GmbH Electro Optical Systems, Krailling (DE)

( * ) Notice: Subject to any disclaimer, the term of this patent is extended or adjusted under 35 U.S.C. 154(b) by 322 days.

(21) Appl. No.: 17/049,515

(22) PCT Filed: Apr. 23, 2019

(86) PCT No.: PCT/EP2019/060392
§ 371 (c)(1),
(2) Date: Oct. 21, 2020

(87) PCT Pub. No.: WO2019/206919
PCT Pub. Date: Oct. 31, 2019

(65) Prior Publication Data
US 2021/0245251 A1    Aug. 12, 2021

(30) Foreign Application Priority Data
Apr. 27, 2018    (DE) ................ 10 2018 110 294.1

(51) Int. Cl.
*G05B 19/4099* (2006.01)
*B33Y 50/02* (2015.01)
(Continued)

(52) U.S. Cl.
CPC .......... *G05B 19/4099* (2013.01); *B22F 10/36* (2021.01); *B22F 10/80* (2021.01);
(Continued)

(58) Field of Classification Search
CPC ..... B22F 10/85; B33Y 50/02; G05B 19/4083; G05B 2219/49023
See application file for complete search history.

(56) References Cited

U.S. PATENT DOCUMENTS

| 11,161,202 B2 | 11/2021 | Shibazaki |
| 2013/0300035 A1 | 11/2013 | Snis |

(Continued)

FOREIGN PATENT DOCUMENTS

| CN | 103338880 | 10/2013 |
| CN | 104775116 | 7/2015 |

(Continued)

OTHER PUBLICATIONS

M. Villar et al., "Laser transmission welding as an assembling process for high temperature electronic packaging," 2016 International Conference on Electrical Systems for Aircraft, Railway, Ship Propulsion and Road Vehicles & International Transportation Electrification Conference (ESARS-ITEC), pp. 1-5 (Year: 2016).*

(Continued)

*Primary Examiner* — Thomas C Lee
*Assistant Examiner* — Tyler Dean Hedrick
(74) *Attorney, Agent, or Firm* — Polsinelli

(57) ABSTRACT

A method and device for generating control data for an additive manufacturing device are described, wherein build-up material is built up and selectively solidified. Irradiating the build-up material on a build field with at least one energy beam occurs An impingement surface of the energy beam is moved on the build field in order to melt the build-up material in a target area in and around the impingement surface. For generating the control data, optimization criteria and/or secondary and/or boundary conditions relating to a local target temperature distribution in the target area of the build-up material are defined so that melting of the build-up (Continued)

material is effected as heat conduction welding. Based on this, an optimized intensity profile of the energy beam is determined, which is substantially non-rotationally symmetric at the impingement surface on the build field.

16 Claims, 9 Drawing Sheets

(51) Int. Cl.
*B22F 10/85* (2021.01)
*G05B 19/408* (2006.01)
*B22F 12/90* (2021.01)
*B22F 10/36* (2021.01)
*B22F 10/80* (2021.01)
*B22F 10/28* (2021.01)
*B22F 10/366* (2021.01)
*B22F 10/368* (2021.01)
*B22F 12/13* (2021.01)
*B22F 10/32* (2021.01)

(52) U.S. Cl.
CPC .............. *B22F 10/85* (2021.01); *B22F 12/13* (2021.01); *B22F 12/90* (2021.01); *B33Y 50/02* (2014.12); *G05B 19/4083* (2013.01); *B22F 10/28* (2021.01); *B22F 10/32* (2021.01); *B22F 10/366* (2021.01); *B22F 10/368* (2021.01); *G05B 2219/49023* (2013.01)

(56) References Cited

U.S. PATENT DOCUMENTS

| | | | |
|---|---|---|---|
| 2015/0198052 | A1 | 7/2015 | Pavlov et al. |
| 2016/0059352 | A1 | 3/2016 | Sparks |
| 2017/0239752 | A1 | 8/2017 | Buller et al. |
| 2017/0239892 | A1 | 8/2017 | Buller et al. |
| 2017/0304946 | A1 | 10/2017 | Shibazaki |
| 2018/0029126 | A1* | 2/2018 | Ng ................... G02B 26/0825 |
| 2019/0118300 | A1* | 4/2019 | Penny ................ B23K 26/0821 |
| 2019/0217416 | A1* | 7/2019 | Brochu ................ B23K 26/34 |
| 2019/0275612 | A1* | 9/2019 | Yap ........................ B22F 12/49 |
| 2021/0354243 | A1 | 11/2021 | Shibazaki |

FOREIGN PATENT DOCUMENTS

| | | |
|---|---|---|
| CN | 107000059 | 8/2017 |
| DE | 102015226523 | 6/2017 |
| DE | 102016220067 | 4/2018 |
| EP | 2893994 | 7/2015 |
| WO | 2016115284 | 7/2016 |
| WO | 2018029478 | 2/2018 |

OTHER PUBLICATIONS

Peretyagin P. Yu.; Zhirnov I. V.; Vladimirov Yu. G.; Tarasova T. V.; Okun'kova A. A.: "Track geometry in selective laser melting", Russian Engineering Research, Allerton Press, New York, NY, US, vol. 35, No. 6; Jul. 15, 2015 (Jul. 15, 2015), pp. 473-476; XP035513345; ISSN: 1068-798X, DOI: 10.3103/S1068798X15060143, 4 pages.

Okunkova Anna; Volosova Marina; Peretyagin Pavel; Vladimirov Yuri; Zhirnov Ivan; Gusarov A V: "Experimental Approbation of Selective Laser Melting of Powders by the Use of Non-Gaussian Power Density Distributions", Physics Procedia, Elsevier, Amsterdam, NL; vol. 56, Sep. 9, 2014 (Sep. 9, 2014), pp. 48-57, XP029053190; ISSN 1875-3892, DOI: 10.1016/j.phpro.2014.08.095, 10 pages.

Tien T. Röhling et al., "Modulating laser intensity profile ellipticity for microstructural control during metal additive manufacturing", Acta Materialia, (20170000), vol. 128, doi:doi: 10.1016/j.actamat.2017.02.025, pp. 197-206, XP029944469; DOI: http://dx.doi.org/10.1016/j.actamat.2017.02.025, 10 pages.

EPO Communication for Application No. 19719501.9, dated May 24, 2022, 10 pages.

Yu Jun et al: Material Properties of Ti6AI4 v Parts Produced by Laser Metal Deposition, Physics Procedia, vol. 39, Jan. 1, 2012 (Jan. 1, 2012), pp. 416-424, XP055850224.

Bonss Steffen et al: Laser heat treatment with latest system components, High Power Laser Materials Processing: Lasers, Beam Delivery, Di-Agnostics, and Applications, SPIE, 1000 20th St. Bellingham WA 98225-6705 USA, vol. 8239, No. 1, Feb. 9, 2012 (Feb. 9, 2012), pp. 1-13, XP060001571, DOI: 10.1117/12.908589.

Blom Antoon et al: "Process spread reduction of laser microspot welding of thin copper parts using real-time control", Algorithms and Technologies for Multispectral, Hyperspectral, and Ultraspectral Imagery XIX—Proceedings of SPIE, vol. 4977, Oct. 17, 2003 (Oct. 17, 2003), pp. 493-507, XP055922597, US, ISSN: 0277-786X, DOI: 10.1117/12.478612, ISBN: 978-1-5106-4548-6.

Sunqvist J et al: "Numerical optimization approaches of single-pulse conduction laser welding by beam shape tailoring", Optics and Lasers in Engineering, vol. 79, pp. 48-54, XP029381344, ISSN: 0143-8166, DOI: 10.1016/J.OPTLASENG.2015.12.001.

* cited by examiner

METHOD AND DEVICE FOR GENERATING CONTROL DATA FOR AN ADDITIVE MANUFACTURING DEVICE

TECHNICAL FIELD OF THE INVENTION

The invention relates to a method for generating control data for a device for additive manufacturing of a manufactured product in a manufacturing process in which build-up material is built up and selectively solidified, wherein for solidifying on a build field, irradiating of the build-up material with at least one energy beam is carried out and in the process of this an impingement surface of the energy beam on the build field is moved in order to melt the build-up material in a target area in and around the impingement surface. Furthermore, the invention relates to a method for controlling a device for additive manufacturing of a manufactured product using the control data. Moreover, the invention relates to a corresponding control data generating device for generating control data and to a control device comprising such a control data generating device or, respectively, an interface to such a control data generating device in order to transfer the control data.

BACKGROUND OF THE INVENTION

Additive manufacturing processes are becoming increasingly relevant in the production of prototypes and now also in series production. In general, "additive manufacturing processes" are to be understood as manufacturing processes in which a manufactured product (hereinafter also referred to as "component") is usually built up on the basis of digital 3D design data by depositing material (the "build-up material"). The build-up is usually, but not necessarily, done in layers. The term "3D printing" is often used as a synonym for additive manufacturing, manufacturing of models, samples and prototypes with additive manufacturing processes is often referred to as "rapid prototyping" and manufacturing of tools is often referred to as "rapid tooling". As mentioned at the beginning, a key point is the selective solidification of the build-up material, wherein in many manufacturing processes, this solidification can be achieved by irradiation with radiant energy, e.g. electromagnetic radiation, in particular light and/or heat radiation, but optionally also with particle radiation, such as electron radiation. Examples of processes working with irradiation are "selective laser sintering" or "selective laser melting". In this process, thin layers of a usually powdery build-up material are repeatedly applied one above the other and in each layer, the build-up material is selectively solidified in a "welding process" by irradiating in a spatially limited manner those areas which, after manufacture, are to be part of the finished product to be manufactured, by partially or completely melting the powder grains of the build-up material with the aid of the energy locally introduced by the radiation at this location. After cooling, these powder grains are then bonded together in a solid body.

In practical application or in the machines or devices for additive manufacturing known up to now, energy beams with substantially rotationally symmetric intensity distributions (also called intensity profile) are usually used for selective solidification. Such a rotationally symmetric intensity distribution often corresponds to a (circularly symmetrical) Gaussian profile. This means that the intensity is highest in the center of the energy beam and decreases in all directions radially outwards transverse to the propagation direction or current beam path direction of the energy beam (hereinafter also referred to as "beam direction" or "beam axis") according to a Gaussian curve. This profile can be obtained without further measures from the energy beam sources used up to now, for example a conventional laser. However, the latest findings or research show that the exact form of the intensity distribution or intensity profile of the energy beam can have a considerable influence on the entire manufacturing process, in particular e.g. on the energy consumption and/or the quality of the manufactured product, for example the microstructure thereof. A comparison between a laser beam with a Gaussian intensity profile and a non-rotationally symmetrical intensity distribution, namely an elliptical intensity distribution, is described, for example, in Tien T. Rohling et al., "Modulating laser intensity profile ellipticity for microstructural control during metal additive manufacturing", in Acta Materialia, 128 (2017), pp. 197-206.

Furthermore, laser sintering of metals with a so-called "deep penetration welding process" ("keyhole mode welding") is currently mostly used in practice. A welding process is defined as a deep penetration welding process when a vapor capillary, also called a "keyhole", is formed. The impinging energy beam, in particular laser beam, creates a pool of molten material or metal. When the surface of the pool of material reaches its boiling temperature, the vapor bubble pushes the molten material sideways and downwards, thus creating the vapor capillary. The diameter of this keyhole is smaller than that of the energy beam or laser beam. The vapor capillary is also created as a function of the speed of movement of the energy beam, for a laser typically from an intensity of 2 MW/cm 2 at 1 m/min. The deeper the keyhole, the greater become the forces that want to cause it to collapse and the more power of the energy beam has already been absorbed, so that finally an equilibrium is established at a certain depth that depends on certain parameters.

An advantage of this deep penetration welding process is the high depth effect. This means that, measured by the focus diameter, significantly higher penetration depths can be achieved than if such evaporation would not take place. A welding process without evaporation is hereinafter also referred to as "heat conduction welding" (also "conduction mode welding" or "conduction laser welding").

However, such a deep penetration welding process also has a multiplicity of disadvantages:

Firstly, the energy beam must provide a relatively high evaporation enthalpy which is approximately one order of magnitude above the melting enthalpy and is extracted from the productive part of the process. Although the evaporation enthalpy recurs during the condensation of the metal vapor, it only occurs at a position relatively far away from the geometry to be produced. The evaporation enthalpy is therefore not available to the workpiece because of this spatial separation. This energy consumption increases the cost of the energy beam.

Secondly, the vaporized material is also usually lost, which in view of the high cost of metal powder can make the component prices considerably more expensive and can influence them.

Thirdly, the volume of the material (under normal conditions) increases by a factor of about 1000 during evaporation. This results in high pressures in the metal vapor within the keyhole, which in turn can result in very high outflow velocities (in the order of Mach 0.3) of the metal vapor from the keyhole. This high-speed gas jet entrains adjacent solid particles and/or droplets leaving the molten pool at high speed, thus causing energy and material losses. These particles and/or droplets are usually referred to as "spatters".

Fourthly, the metal gas that condenses again shortly after leaving the keyhole usually flows exactly counter to the direction of incidence of the energy beam, with which the condensate can therefore interact in an uncontrolled manner by absorption and scattering. To avoid this process-relevant disturbance as far as possible, the flow direction of the metal gas can be diverted as quickly and efficiently as possible. This can be done with a flow curtain of inert gas that is oriented tangential to the powder bed, but its speed must be high enough to sufficiently reduce the undesired effects. However, the flow velocity is then usually so high that relevant quantities of powdered material can be carried away from the powder bed, just as strong winds entrain dust from the ground (wind erosion). By means of a process gas circulation system, process by-products or impurities, such as metal condensate or raw powder, are usually removed from the process chamber and can be collected downstream of the process chamber in filters and, optionally, separators of the exhaust air system. This material is often lost and must also be disposed of in a complex and cost-intensive manner.

The material losses from the various sources of loss explained above can add up to a multiple of the weight of the constructed components. Avoiding or significantly reducing these losses would therefore result in a considerable cost reduction.

In practice, attempts were made at times to control the process by setting a variable focus. For this purpose, a variable expander was used, which shifts the focus of the laser beam downwards so that the beam impinges the processing plane outside its waist with a larger diameter. However, with increasing laser power, this concept becomes more and more susceptible to intensity fluctuations caused by a shift in the longitudinal direction of the laser beam. In addition, with this approach, the focus diameter can only be selected to be just large enough to still achieve the required detail resolution of the process, which is substantially determined by the focus diameter, the layer thickness and the powder grain size. If, in order to increase productivity, an attempt is then made to increase the exposure speed, i.e. the feed speed of the laser beam on the surface, without simultaneously increasing the focus diameter since the focus diameter cannot be increased due to the required detail resolution, this leads to an increase in intensity. The increase in intensity in turn intensifies the above-mentioned undesirable side effects of the deep penetration welding process. The keyhole then becomes deeper and thus more unstable. A collapsing keyhole is indicated by a molten pool that solidifies uncontrollably and in extreme cases can even lead to material defects such as pores. Ultimately, this approach would therefore limit the amount of energy per laser beam that can be coupled into the material. Since, in turn, the number of energy beams used is not arbitrary and can only be increased within narrow limits, the approach thus limits the overall system productivity and thus also a control variable for reducing production costs.

SUMMARY OF THE INVENTION

It is an object of the present invention to provide methods for generating control data or for additive manufacturing of a manufactured product as well as suitable devices for this purpose which address the problems mentioned above.

This object is achieved by a method for generating control data according to claim 1, a method for controlling a device for additive manufacturing of a manufactured product according to claim 11, a control data generating device according to claim 12, a control device for a device for additive manufacturing of a manufactured product according to claim 13 and a device for additive manufacturing of manufactured products according to claim 14.

As mentioned above, in the method according to the invention, control data are generated for a device for additive manufacturing of a manufactured product in a manufacturing process. In this manufacturing process, build-up material, preferably powder, is built up in a process chamber of the device, preferably in layers, and selectively solidified by means of energetic irradiation, in particular in the respective layers. For this purpose, irradiation of the build-up material using an energy beam is carried out on a build field, as mentioned above. In doing so, an impingement surface of the energy beam is moved on the build field. "Moving" can be understood here as the usual deflection of the energy beam, e.g. by galvanometer mirrors, but also as a displacement of the complete beam output unit, e.g. in the form of a diode bank, in particular a laser diode bank, or by moving beam shaping.

By means of the energy introduced with the energy beam, the build-up material melts in a target area in and around the impingement surface. A "target area" in this context is to be understood, on the one hand, as the impingement surface, i.e. the area on which the energy beam impinges on the surface, but also the area therebelow, i.e. into the depth of the material or layer, but optionally also as an environment surrounding this impingement surface in which the energy beam is still effective, e.g. through heat conduction in the build-up material. Just for the sake of completeness, it should be mentioned again that the energy beam can be both particle radiation and electromagnetic radiation, such as light or preferably laser radiation.

The control data can therefore preferably be exposure control data, such as scan data defining or specifying the movement of the energy beam on the surface, control data for adjusting the level of energy or laser intensity, control data on the "shape" of the beam or the beam profile and/or the focus or the extent of the beam perpendicular to the beam direction. Furthermore, as will be explained later, these control data can also comprise other control information, such as coating control data that specifies how thick a current layer is, information for controlling pre- or postheating with other energy input means, for injecting inert gas, etc.

It should also be mentioned at this point that the control data can be used, on the one hand, for a "simple" controlling of the process, but also for feedback control of the process, for example by specifying target data for advanced feedback control of the process. In other words, with the help of the method according to the invention, the required variables can also be derived for a controller which, for feedback, receives actual data, which are determined using melt pool monitoring or a temporally resolved optical tomography.

According to the invention, for generating the control data for at least one irradiation mode, optimization criteria and/or secondary and/or boundary conditions relating to a local target temperature distribution or, respectively, a target temperature profile in the target area of the build-up material is defined, at which melting of the build-up material within the target area is effected as heat conduction welding. In other words, criteria and requirements for the target temperature distribution are defined such that the target temperature defined thereby lies within the target range in the process window of the above-described heat conduction welding and a "switching" or a transition to the deep penetration welding process or into an undefined or unstable welding regime is avoided. On the basis of these optimization criteria and/or secondary and/or boundary conditions, at least one optimized intensity profile or intensity distribution of the energy beam is then determined, preferably within the scope of an optimization process which will be explained in more detail later. According to the invention, it is ensured that the optimized intensity profile of the energy beam at the impingement surface on the build field is substantially non-rotationally symmetric with respect to a beam axis (or an imaginary rotation axis) running coaxially to the energy beam. Accordingly, the expression "at the impingement surface" is to be understood such that it means the intensity profile in an imaginary plane perpendicular to the direction of incidence just before the impingement surface, which in most situations does not correspond to the intensity profile directly on the surface of the build field or in the working plane, since the energy beam usually impinges on the build field at an angle. However, this does not exclude that in the course of the determination of the optimized intensity profile, the respective inclination is also taken into account since the orientation of the incidence direction on the build field also determines the influence of the optimized intensity profile on the local target temperature distribution.

Up to now, as also mentioned above, the energy beams have been generated in such a manner that they are generally rotationally symmetric with respect to a beam axis that is coaxial to a beam direction of the energy beam, and have a Gaussian-shaped intensity distribution. The term "substantially non-rotationally symmetric" means that this concerns energy beams whose intensity distribution has deliberately been generated to a significant degree in a non-rotationally symmetric manner or has been changed accordingly by specific modification of a beam (such intensity distributions are thus considered "non-rotationally symmetric" in the context of the invention). This does not include energy beams which per se should have a usual rotationally symmetric intensity distribution, e.g. Gaussian-shaped, and only show undesired deviations from the rotational symmetry, e.g. due to unintentional distortions or other imperfections of the system for generating and/or moving the energy beam or within usual tolerances. If, for example, the intensity distribution of the output energy beam generated in the desired manner were mathematically described as a function $I(r, \phi)$ of the location in polar coordinates $r$ and $\phi$ (in a plane perpendicular to the beam direction), the intensity distribution could preferably be described or defined as "non-rotationally symmetric" if no point of origin can be found within the intensity distribution which, for any m, under the condition $m \geq 2$, and any r, fulfils the following property:

$$\left| 1 - \left( \frac{I(r, \phi_0)}{I(r, \phi_0 + 360°/m)} \right) \right| < \varepsilon$$

wherein $\varepsilon \leq 0.01$, preferably $\varepsilon \leq 0.05$, more preferably $\varepsilon \leq 0.1$, even more preferably $\varepsilon \leq 0.2$.

Preferably, the intensity distribution is chosen such that it is also non-homogeneous, i.e. does not have substantially the same intensity over the entire cross-sectional area—apart from the usual tolerances.

The control data generated in this way for the respective irradiation mode are then used for activation and, as mentioned, optionally also for feedback control of the device for additive manufacturing in the respective irradiation mode, so that the irradiation of the build-up material with an energy beam is then substantially carried out with the determined optimized intensity profile. This means, it is ensured that the energy beam at the impingement surface on the build field corresponds to the determined intensity profile or at least approximates it as closely as possible to certain tolerances, so that subsequently the desired local target temperature distribution is then also achieved (while fulfilling the other process parameters of the irradiation process, as will be explained later).

A preferred irradiation mode in which the method according to the invention can be applied is a so-called "core mode" in which the component is solidified inside. In addition, in many production processes there are further solidification modes, such as a contour mode in which the (outer) contours of the component are solidified, or modes for solidifying support structures which are not actually part of the component, etc. However, this does not exclude the possibility that the method according to the invention can also be used in the other modes, if this is desired.

It should be noted at this point that herein and in general "boundary conditions" are to be understood as conditions that can only be influenced with great effort or not at all and must therefore be used as given variables in the determination of the optimized intensity profile or in the optimization process. "Secondary conditions", on the other hand, are usually such conditions that differ from the actual main condition, i.e. the actual optimization criteria, but which are to be fulfilled additionally and can often restrict the solution set of parameters that is mainly to be achieved and the parameters of which fulfill the optimization criteria. In contrast, an optimization criterion is to be understood as a function or a plurality of functions that contains or contain the parameters to be optimized as function parameters. These functions represent a mathematical relationship that is to be optimized within the scope of an optimization process, i.e. for which an optimal parameter value or parameter values is/are to be found, as well as a target value or setpoint value to be achieved in the process of this.

With the help of the method according to the invention, it is possible to control the manufacturing process in such a manner that the problems mentioned at the beginning, which are caused by the deep penetration welding process, can be avoided by achieving an approximately ideal surface temperature, for example an even temperature distribution, on the surface or in the target area around the impingement surface. On the one hand, the energy input can hereby be maximized and, on the other hand, other process-relevant aspects are taken into account, in contrast to a normal rotationally symmetric Gaussian process which has been used up to now. In particular, if a Gaussian laser beam, in which the intensity is highest in the center and decreases bell-shaped and rotationally symmetrical towards the edge, impinges on the molten metal pool, this results in a temperature distribution on the surface, which accordingly has a maximum somewhere in the middle area. There, evaporation will inevitably begin at some point as the power is successively increased. Due to the heat dissipation through the molten pool into the material, i.e. into the depth of the current surface, the temperatures below the surface of the molten pool are then usually lower than at the surface. Furthermore, the surface tension of the molten metal (like that of most fluids) is also temperature-dependent, among other things. These locally varying surface tensions provide for a material flow from areas with low surface tension towards areas with higher surface tension. This effect is called thermocapillary convection (also known as the Marangoni effect). If, for example, the surface tension decreases with increasing temperature (wherein the temperature dependence of the surface tension depends on the material and the protective gas used), material flows from the warm to the cold areas of the liquid surface. In the case of the above-mentioned Gaussian intensity profile, accordingly, a flow from the center of the profile to its edges would be formed. This flow is diverted downwards at the molten pool edge into deeper regions of the molten pool and at the bottom of the molten pool it is again in the center thereof where it rises centrally upwards to the surface again and starts the cycle anew. Such thermocapillary convection can reach speeds of up to 100 m/s in the molten pool. Taking into account the time in which the material is in the liquid phase, simulations show that this circular flow circulates about twice under normal exposure parameters before the metal solidifies again. Depending on the sign of the Marangoni number (i.e. the respective temperature/surface tension gradient), thermal energy is also transported together with the material into the colder, outer or deeper regions of the molten pool. This flow also constitutes a source of turbulence, which can cause unsteadily solidified surfaces and/or even ejection of droplets from the molten pool.

Within the scope of the procedure according to the invention, thus the optimization of the temperature profile in the target area, in particular on the build field, it is possible with the aid of an optimized intensity profile that by means of a suitable predetermined temperature profile or by specifying the correspondingly required optimization criteria and/or secondary and/or boundary conditions, the influence of the temperature dependency at the surface of the molten pool can even be used specifically to control convection in the molten pool. Thus, for example, it is possible to specifically set temperature profiles which reverse the thermocapillary convection with respect to the usual direction described above in order to force a mass transport and thus also a heat transport by convection into the depth. Thereby, the "effective penetration depth" or "molten pool depth" or "welding penetration depth" could be increased, which will allow thicker layers to be fused and at the same time the "hardening width" (the "melt pool width") can be reduced, which would benefit the accuracy of detail, wherein "hardening width" is to be understood as the maximum expansion perpendicular to the direction of movement of the energy beam on the build field. Furthermore, if desired, thermocapillary convection can also be completely prevented or at least greatly reduced by homogenizing the surface temperature in order to achieve a smoother component surface.

Which strategy exactly is used or how the respective optimization criteria and/or secondary and/or boundary conditions are defined for this purpose depends on the respective application, thus, for example, which irradiation mode is involved, which component is manufactured, which conditions and desired component properties are to be achieved, which materials are used etc. In any case, conditions for a desired actual state of the temperature profile to be achieved (set) at the surface of the molten pool can be specified by means of the method according to the invention in order to optimize the entire production process.

In a method according to the invention for controlling a production device for additive manufacturing of a manufactured product, control data are first generated in the manner according to the invention and then used to control the device with the control data. The control data can be generated in advance and send as a complete package or a kind of "control protocol" to the device, which then carries out the production process. In principle, however, it would also be possible to determine control data for subsequent process steps while the process is already running, for example while one layer is being solidified, to determine the control data for the next layer and to use during the solidification of the next layer.

The initial base for the control data is, among other things, data that specify at which points within the process space or build field material is to be solidified, i.e. which parts should later belong to the component or to any support structures or the like and which areas should not. This data can be taken, for example, from a digital 3D model of the object to be manufactured and/or the supporting structures. If these data and other required information are available, such as which material is used, which solidification device, in particular which type of energy beam, is available or within which parameters the solidification device can be adjusted etc., the desired optimized intensity profile can be determined with the help of the specified optimization criteria and/or secondary and/or boundary conditions for defining the local target temperature distribution, and the control data can be determined accordingly.

A control data generating device in accordance with the invention for generating control data for a device for additive manufacturing of a manufactured product is designed in such a way that for generating the control data for at least one irradiation mode, optimization criteria and/or secondary and/or boundary conditions with respect to a local target temperature distribution of the build-up material can be defined in the target region, in which melting of the build-up material within the target region is effected as heat conduction welding. For example, these optimization criteria and/or secondary and/or boundary conditions can be specified via a user interface or by a higher-level control protocol etc.

Furthermore, the control data generating device is designed in such a way that it determines at least one optimized intensity profile of the energy beam on the basis of the optimization criteria and/or secondary and/or boundary conditions, wherein the optimized intensity profile of the energy beam, as described, is substantially not rotationally symmetric at the impingement surface on the build field. The control data are generated in such a way that when activating (optionally at a later time) the device for additive manufacturing in the irradiation mode, the irradiation of the build-up material with an energy beam is substantially performed with the determined intensity profile. This means that the control data generating device is designed in such a way that control data are generated with which the device for additive manufacturing can be controlled accordingly using these control data.

For example, the control data generating device can be part of a control device of such a production device for additive manufacturing of a manufactured product. However, it can also be implemented independently on another computer in order to then transfer the data to the control device.

Accordingly, a control device according to the invention for such a device for additive manufacturing of a manufacturing process has a control data generating device according to the invention or an interface to such a control data generating device for providing the relevant control data or for receiving the control data from the control data generating device, and this control device is designed to activate the device for irradiating the build-up material with the energy beam using these control data.

A device according to the invention for additive manufacturing of manufactured products in an additive manufacturing process comprises at least one such control device in addition to the usual components, such as a feed device for introducing build-up material—for example in the form of a layer of build-up material—into a process chamber, and an irradiation device for selectively solidifying the build-up material by irradiation with an energy beam.

It should be noted at this point that the device according to the invention may also have a plurality of irradiation devices which are then activated with the control data in a correspondingly coordinated manner in order to achieve the local target temperature distribution. It should also be mentioned once again that so far the energy beam, the intensity profile of which is optimized, can also consist of a plurality of superimposed energy beams and, accordingly, it is then ensured that these superimposed partial energy beams together have the optimized intensity profile, which then leads optimally to the desired target temperature distribution or ensures that the secondary and/or boundary conditions for the local target temperature distribution are met and the optimization criteria are fulfilled as far as possible.

The control data generating device according to the invention can be implemented in the form of a computer unit with suitable software. For this purpose, the computer unit may have, e.g., one or more cooperating microprocessors or the like. In particular, it can be implemented in the form of suitable software program parts in the computer unit of a control device of a production device according to the invention. A largely software-based implementation has the advantage that even computer units already in use, in particular control devices of production devices for additive manufacturing, can be easily retrofitted through a software or firmware update in order to work in the manner according the invention. In this respect, the object is also achieved by a corresponding computer program product with a computer program which can be loaded directly into a storage device of a computer unit, in particular a control device, with program sections in order to execute all steps of the method according to the invention when the program is executed in the computer unit or control device. In addition to the computer program, such a computer program product may include, if necessary, additional components such as documentation and/or additional components, including hardware components such as hardware keys (dongles etc.) for using the software. A computer-readable medium, for example a memory stick, a hard disk or another transportable or permanently installed data carrier, on which the program sections of the computer program that can be read and executed by a computer unit, in particular the control device, are stored, may be used for transport to the computer unit or control device and/or for storage on or in the computer unit or control device.

Further particularly advantageous embodiments and further developments of the invention arise from the dependent claims and the following description, wherein the independent claims of one claim category may also be further developed analogously to the dependent claims and exemplary embodiments of another claim category, and in particular individual features of different exemplary embodiments or variants may be combined to form new exemplary embodiments or variants.

There are various possibilities for generating an energy beam with the determined optimized intensity profile. For example, the desired beam shaping may already take place when the energy beam is generated.

For example, a laser could be constructed with many laser channels that can be combined coherently so that they act and function together as a single coherent laser source. This could inherently offer the possibility to additionally modulate each individual laser channel highly dynamically in terms of phase and amplitude to achieve the desired variable beam shaping, in particular the desired intensity profile.

Furthermore, an arbitrary energy beam generated by an energy beam source, thus also an initially rotationally symmetric energy beam, can only be "shaped" or modified at a later time within a beam shaping device in order to obtain the desired beam profile. Such a beam shaping device can also be implemented in different ways.

Preferably, the beam shaping device can have at least one micro-optical element which can be activated by the control device. Particularly preferred is a so-called diffractive optical element (in English also known as "Diffractive Optical Element", DOE).

DOEs can operate reflectively or transmissively and change the wavefront of an incident beam by locally modulating the phase and/or amplitude of the reflected or transmitted partial beams.

Active DOEs, on the other hand, can be understood as the above-mentioned arrangements (e.g. arrays) of multiple, basically coherent laser sources in which the phase and/or amplitude of each individual laser beam can be controlled independently of each other but relative to each other, which also makes it possible in the far field to achieve manipulation of the intensity distribution resulting from the superposition of the individual laser beams.

DOEs, on the other hand, are particularly suitable for use in a beam shaping device that is intended to (later) modify an already generated incoming energy beam.

Preferably, a beam shaping device comprises at least one beam splitter, which can also be configured as a DOE, for example, to split an "input energy beam" into at least two beams. The beam splitter can preferably comprise a thin-film polarizer. Such a thin-film polarizer generates two linearly polarized partial beams for which there are then again various possibilities for modifying the intensity distribution.

For this purpose, the beam shaping device can have at least one beam shaping element, for example. Preferably, the beam shaping device has a plurality of such beam shaping elements, for example beam shaping elements associated with the different partial beams, in particular the linearly polarized partial beams. However, this does not exclude the possibility that a plurality of beam shaping devices may also be associated with one partial beam.

Particularly preferably, at least one of the beam shaping elements, more particularly preferably all beam shaping elements, comprises or is an LCoS display (LCoS=Liquid Crystal on Silicon, also referred to as LCoS micro-display). With such LCoS displays, it is relatively easy to shape linearly polarized beams in the desired way or to change their intensity distribution in a plane perpendicular to the beam axis. An LCoS display is another example of a passive DOE in the sense described above.

The beam shaping device preferably also has a beam combiner in order to (re-)combine at least two energy beams.

This beam combiner can preferably also include a polarizer, particularly preferably a thin-film polarizer. With such a beam combiner it is thus possible, for example, to recombine the two linearly polarized partial beams after their modification by the beam shaping elements and thus to generate again an output energy beam, the intensity profile of which has been dynamically modified in the desired way.

In order to generate an energy beam with the desired, substantially non-rotationally symmetric intensity distribution using a beam shaping device, this beam shaping device preferably has at least one control interface and more preferably, is designed in such a way that the intensity distribution of the energy beam can be dynamically modified by means of the control device at least within a certain bandwidth. This makes it possible to permanently adapt the non-rotationally symmetric intensity distribution to the current requirements quasi "on the fly" via the control device and thus to achieve the optimum structural results in each solidified area.

Here, the input energy beam can come from any beam source. In principle, it can also comprise a bundle of superimposed partial beams. Preferably, but not necessarily, this is a laser beam.

Likewise, it is also possible to change the intensity distribution of an energy beam with a non-rotationally symmetric intensity distribution in a beam shaping device, i.e. to combine the methods.

Preferably, at least one of the further following process parameters, preferably a plurality of these process parameters, is additionally determined on the basis of the optimization criteria and/or the secondary and/or boundary conditions (wherein these may be in part further irradiation process parameters, but also other process parameters):

radiation intensity of the energy beam. For this purpose, absolute values of the beam profile can be determined, for example, which maximum or minimum value the radiation intensity has, wherein it is sufficient to determine one of these values since the other value is then determined by the beam profile. In particular, the power of the energy beam is also determined in the process of this;

at least one beam expansion in at least one direction transverse to the direction of irradiation, thus, for example a beam diameter or a beam width, wherein a beam width is always to be understood to be the expansion perpendicular to the current direction of movement of the impingement surface on the build field. Alternatively or additionally, the complete shape of the energy beam at the impingement surface on the build field can be determined. The beam expansion can be influenced by a focus adjustment, for example;

the movement speed of the impingement surface of the energy beam on the build field, i.e. the scanning speed, which can also be modified depending on the location, i.e. it does not need be constant;

a layer thickness of the respective layer of build material applied or to be solidified;

parameters for determining the irradiation strategy. The selective irradiation or movement of the impingement surface of the energy beam on the build field is usually carried out according to a suitable "irradiation strategy". Typically, larger two-dimensional areas, i.e. larger surface areas, are to be irradiated on the build field during a solidification process. Irrespective of how the energy beam is generated and precisely how the point of impact on the build field is moved, it has proved advantageous to first virtually "divide" at least such larger areas to be irradiated according to a selected pattern, for example into virtual "stripes", a diamond pattern, a checkerboard pattern or the like. The individual surface areas of this pattern, thus defined sub-areas, for example geometrically normalized areas such as stripes or fields, are then usually scanned with the energy beam in the form of a so-called "hatching" (generally and in the following also called "hatch"). Thus, in the case of a striped pattern, the build material is—macroscopically seen—gradually solidified along parallel stripes and in detail—microscopically seen—the movement of the impingement surface of the energy beam on the build field takes place along closely spaced hatch lines, which run back and forth transverse to the direction of extent of the respective irradiation stripes within the boundaries of the irradiation strip. As irradiation strategy parameters, for example, an irradiation pattern and/or a hatching strategy can be selected, such as whether to work with an alternating hatching direction (alternating irradiation) or with a constant hatching direction (unidirectional irradiation, i.e. with a jump back from one hatch end to the beginning of the following neighboring hatch in the irradiation stripe).

The further process parameters can be considered as being variable, i.e. as input variables that can also be optimized within the optimization process, for example. In many cases, this is also useful, in particular as far as the radiation intensity and the beam expansion are concerned, since these, together with the beam profile, have the most substantial influence on the temperature distribution. However, other ones of these parameters can also be defined in advance, e.g. as a fixed target variable, such as the layer thickness or the irradiation strategy. In this case, it may be helpful to make the relevant parameters themselves boundary conditions if these are to be strictly fulfilled.

There are various possibilities for determining the optimization criteria and/or secondary and/or boundary conditions:

In a preferred embodiment of the method, the target area and optionally a defined environment around the target area, preferably an environment of maximally about five times, particularly preferably maximally about three times the extent of the impingement surface itself, are virtually divided into spatially different process zones, the extent of the impingement surface being defined in such a way that within the impingement surface, 99% of the radiant power of the energy beam impinges on the build field. To this end, the relative spatial arrangement of the process zones to one another is defined with respect to a coordinate system that is fixed in relation to the energy beam, i.e. the coordinate system is moved along with the energy beam on the build field surface and also rotates jointly with the energy beam when there is a change in movement. Preferably, the z-coordinate is perpendicular to the build field at the intersection of the beam axis with the build field surface or working plane and the x- and y-coordinates are perpendicular thereto; for example, the x-coordinate is always in the direction of movement of the impingement surface of the energy beam on the build field and the y-coordinate is perpendicular thereto.

The spatially different process zones can be, for example, a melting zone on which the energy beam acts directly and melts the build material, and a heat-affected zone situated around it. In the heat-affected zone, for example, the temperature can still be higher with respect to the material that has not yet been heated or has cooled down already, it can be, for example, 0.3 times the absolute solidus temperature. These zones can also be subdivided into sub-zones, as will be explained in more detail later based on a plurality of exemplary embodiments.

Preferably, different optimization criteria and/or secondary and/or boundary conditions are associated with different process zones, i.e. different sub-areas in the target area and the environment. Examples for this will also be given. By the subdivision into different process zones it is thus possible to adjust the optimization criteria and/or secondary and/or boundary conditions very precisely and thus to determine an even better optimized intensity distribution, which further facilitates the production process.

As already mentioned, the optimization criteria and/or the secondary and/or boundary conditions regarding the local target temperature distribution can depend on the material. Thus, e.g., for the most effective process control in the process window of heat conduction welding, care should be taken to ensure that the temperature is close to the evaporation temperature of the material used or the lowest evaporation temperature of a material component in a combination of materials used (e.g. alloy), but not higher.

Therefore, at least one material characteristic value of the build-up material is preferably taken into account when determining the optimization criteria and/or secondary and/or boundary conditions regarding the local target temperature distribution. Particularly preferred, at least one of the following parameters, preferably a plurality of these parameters, is taken into account:

characteristic values for the description of the phase transformations of the build-up material. These include, for example, the nucleation rate and/or the nucleation growth rate;

cooling rates and temperature holding points, e.g. for forming and/or avoiding phase transformations of the build-up material;

spatial temperature gradients, in particular permissible spatial temperature gradients for avoiding damage caused by internal stresses induced in the course of the process;

thermal conduction coefficients of the build-up material;

heat capacity of the build-up material;

density of the build-up material;

thermal conductivity. This is calculated from the quotient of the thermal conduction coefficient and the product of the heat capacity and density of the build-up material;

surface tension of the build-up material;

phase transformation enthalpies of the build-up material, i.e. the energy that is required to initiate a phase or is released when a phase is formed;

boiling or evaporation temperature of the build-up material or of at least one of its components, preferably the lowest boiling or evaporation temperature if the build-up material comprises a plurality of components.

melting temperature of the build-up material or at least one of its components, preferably the lowest melting temperature if the build-up material comprises a plurality of components.

With the material characteristic values, which are temperature- and phase-dependent, it is in principle also possible to specify a multiplicity of corresponding material characteristic values or, respectively, tables or functions, which define the respective material characteristic value as a function of temperature and phase. This relates, for example, to the thermal conduction coefficient, the heat capacity, the density or the thermal conductivity as well as the surface tension.

In principle, when specifying material characteristic values, any potential changes in the mentioned parameters due to a reaction with an inert gas atmosphere can also be taken into account. This means that the characteristic values are corrected accordingly, e.g. with suitable correction functions, or tables are made available with which the appropriate values can be selected depending on the inert gas, etc.

Preferably, at least one optimization criterion relates to at least one of the following parameters:

Local temperature at the respective location on the build field. The temperature should preferably be as close as possible to the evaporation temperature, or to the lowest evaporation temperature in the case of a material that comprises a plurality of components, but not at a location thereabove. In this way, it can be reliably achieved that the process remains within the process window of heat conduction welding, but is still very effective because high energies can be introduced.

Local temperature gradient at the respective location on the build field. This gradient should also be as close as possible to a local target temperature gradient.

A cooling rate. This rate should be as close as possible to a target cooling rate.

Power of the energy beam. This power should be as low as possible to save energy.

Speed of movement of the impingement surface of the energy beam on the build field, i.e. the scanning speed. This speed in turn should be as high as possible in order to achieve a high production rate. Since a lowest possible power of the energy beam and, at the same time, a high scanning speed of the energy beam are contraindicated with respect to the energy that can be applied, a Pareto optimum is preferably found within the scope of an optimization method.

Examples of target variables belonging to various optimisation criteria are given below.

Preferably, at least one of the following target variables, preferably a plurality of these target variables, is determined for specifying the optimization criteria and/or secondary and/or boundary conditions regarding the local target temperature distribution:

A permissible temperature development over time. For example, a target cooling rate and/or certain temperature holding points could be specified for this purpose. It can be taken into account here that the temperature development can be different for different process zones, as mentioned above. In particular, the temperature development in the melting zone is usually different from that in an adjacent heat-affected zone.

Local target temperature gradients at the respective location. This can also be defined differently for different process zones.

A target molten pool depth, i.e. the targeted molten pool depth or weld penetration depth, which in turn may depend on the layer thickness.

A target surface quality. For example, the avoidance of effects by thermocapillary convection and/or a maximum permissible local curvature of the surface could be specified as a target variable.

A target build rate. In this case, it could then be optimized such that a desired speed in production is achieved. The target build rate is related in particular to the above-mentioned power of the energy beam and the scanning speed.

A permitted deviation from the (permissible) maximum temperature, in particular in the melting zone.

A target molten pool shape, thus, for example, a desired shape to fill gaps in an already solidified hatch structure.

Likewise, as mentioned, there can be a multiplicity of secondary and/or boundary conditions to define or limit the local target temperature distribution. Preferably, at least one secondary and/or boundary condition relates to compliance with at least one of the following parameters or specifications:

Maximum temperature. In general, as already mentioned, this is the evaporation temperature of the material or a material component, i.e. the maximum allowable temperature to stay within the process window of heat conduction welding. This maximum temperature is given by the material or material components used and cannot be changed without changing the material. Therefore, this is a boundary condition.

Minimum temperature. In general, the melting temperature of the material or liquidus temperature of the alloy used is specified here. Thus, this is also a boundary condition for a given material.

A continuous temperature curve at a boundary between two adjacent process zones. Preferably, the temperature curve should be continuously differentiable at least once. The temperature curve is particularly preferred to be almost smooth, i.e. it should be continuously differentiable at least three times. A continuous temperature curve ultimately means that there are no jumps at the boundaries or transitions between two adjacent process zones, which in fact would be unreal. Within an optimization process, this specification can be specified as a secondary or boundary condition. This means, for example, that the condition "continuously differentiable at least once" is fixed as a boundary condition, and as a secondary condition it is required to achieve the smoothest possible temperature curve.

Minimum molten pool depth. This can be the desired depth of the molten pool or welding penetration depth to ensure a bond to the previously solidified layer. This can also be specified as a secondary or boundary condition, i.e. that a certain minimum molten pool depth, but if possible an optimum value, for example within certain boundaries, is achieved.

In the optimization, all of the above parameters or specifications can also be specified and fulfilled in combination, or only parts thereof. In particular, depending on the strategy, different parameters or parameter values can also be selectively defined as optimization criteria or target variables, secondary conditions and/or boundary conditions.

A further boundary condition that can be or preferably should be considered is the condition of energy conservation in the process. Since, in principle, energy introduced must be discharged, it is accordingly preferable to ensure in an optimization process that no more energy is introduced than can be discharged.

Likewise, the maximum possible local (optical) resolution of the beam shaping device or the beam generating device, or a switching time or switching frequency when switching between certain beam properties when shaping the intensity profile, could also be taken into account as a boundary condition, as well as a secondary condition that the scanning speed should always be greater than zero so that an energy beam does not remain at one location.

Depending on the materials, the selected energy beam and other process conditions such as permitted scanning speeds, the inert gas used, the target build rates and surface qualities to be achieved etc., the determined optimized intensity profile of the energy beam may have completely different shapes. This means that—independent of how and where the non-rotationally symmetric intensity distribution is achieved—any forms of non-rotationally symmetric intensity distributions or intensity profiles are conceivable.

First experiments have shown that, in particular in the first instance (thus, for example, for a first track or a first hatch), intensity distributions can be optimal which have an axial symmetry on the build field, the axis of symmetry of which runs along the movement vector of the impingement surface on the build field, thus, for example, an intensity distribution which is axisymmetric in the scan direction and in which the energy beam has a higher intensity in a region shifted forward from the beam axis than in a rear region (the terms "forward" and "rear" referring to the current movement direction). Such a shape could be achieved, for example, by superimposing two Gaussian distributions which are shifted with respect to each other, i.e. a stronger Gaussian distribution leading in the scan direction and a larger Gaussian distribution, the midpoint of which is shifted against the scan direction towards the higher Gaussian distribution. In the case of a particularly preferred optimized intensity profile, this profile has a maximum range, i.e. a range of highest intensity, in an area of the impingement surface on the build field. As mentioned, this maximum range is then preferably shifted more forward in a movement direction of the energy beam on the build field, thus in the scan direction.

If tracks are run adjacent to already solidified areas, this can be taken into account and accordingly, a deviation from an axisymmetric intensity distribution can be advantageous.

Not only the intensity profile, but also a dimension of the impingement surface of the energy beam on the build field, i.e. the beam expansion of the energy beam on the build field, can be determined or optimized together with the intensity profile. Particularly preferably, the impingement surface of the energy beam on the build field has a beam width (perpendicular to the scan direction) of at least 400 µm, preferably at least 600 µm, particularly preferably at least 800 µm, e.g. approx. 1 mm.

As already explained at the beginning, the heat conduction welding process should be used in at least one irradiation mode, preferably in the core mode, in which the interior of the component is to be fabricated. As explained, this mode usually works with a hatch structure.

In contrast to this, a contour mode usually works with an energy beam and without a hatch structure, wherein the energy beam travels in one pass along the entire contour of the component to be manufactured in the respective layer plane. A similar procedure may be desired inside the component, for example in areas with holes. Under certain circumstances, a heat conduction welding process is not desired for such special irradiation modes.

In a preferred variant of the method, therefore, the energy beam in the manufacturing process is selectively generated in a further irradiation mode, particularly preferred in a contour mode, in such a manner that melting of the build-up material within the target area is effected as deep penetration welding.

For example, in order to reliably guide an energy beam along the corners in a component cross section, a relatively small beam diameter can be advantageous. However, since sufficient penetration depths cannot always be achieved with a small beam diameter when working in a heat conduction welding process with constant layer thickness, switching to another mode, e.g. a deep penetration welding process, can be advantageous.

BRIEF DESCRIPTION OF THE DRAWINGS

The invention is explained again in more detail in the following with reference to the attached figures by means of exemplary embodiments. In the different figures, identical components are designated with identical reference numbers. In the figures.

DETAILED DESCRIPTION OF THE EMBODIMENTS

The following exemplary embodiments are described with reference to a device 1 for additive manufacturing of manufactured products in the form of a laser sintering or laser melting device 1, wherein it is explicitly pointed out once again that the invention is not limited to laser sintering or laser melting devices. In the following, the device is therefore referred to in short as "laser sintering device" 1, without loss of generality.

Figure 1:
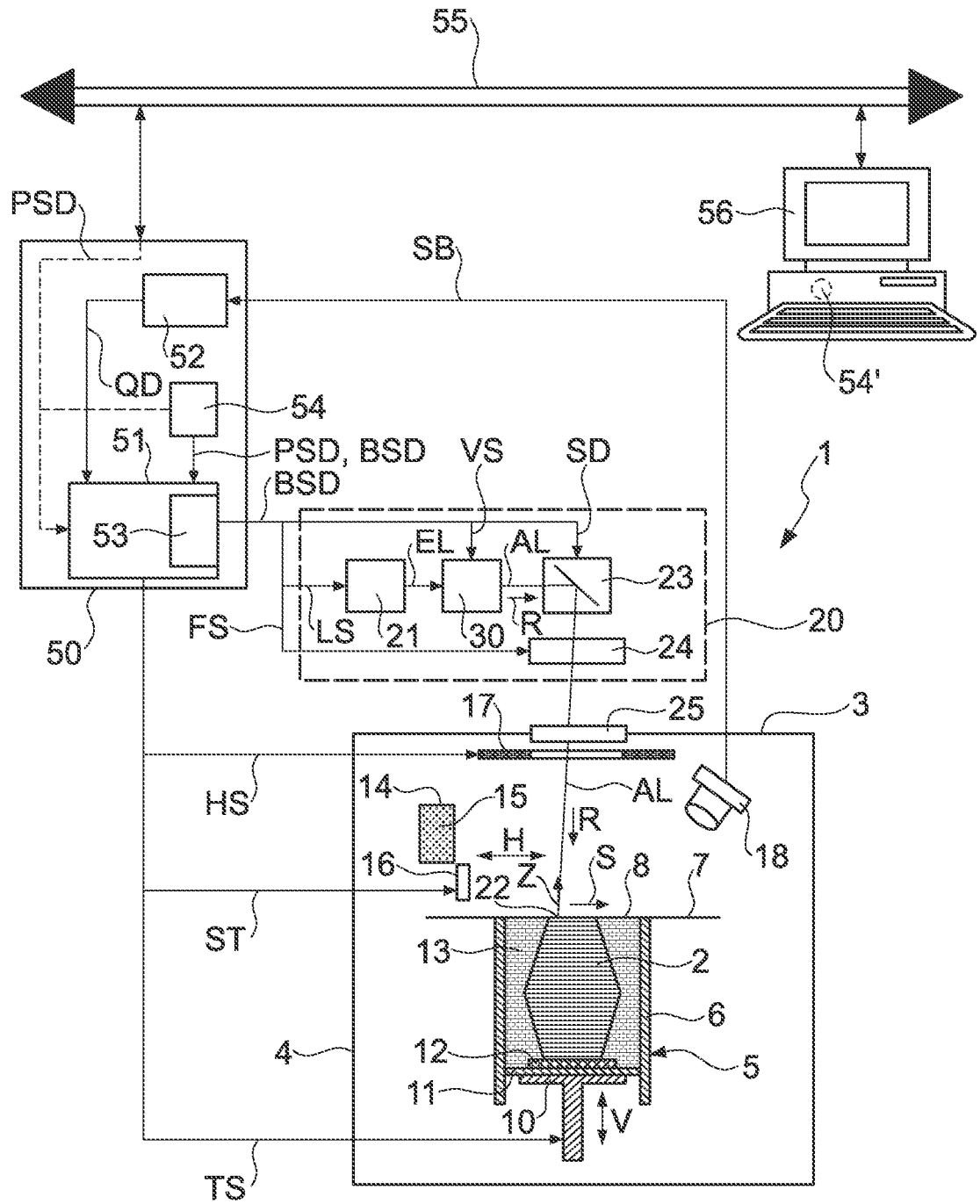
FIG. 1 is a schematic partial sectional view of an exemplary embodiment of a device for additive manufacturing with a control data generating device according to the invention.

Such a laser sintering device 1 is shown schematically in FIG. 1. The device has a process chamber 3 or a process space 3 with a chamber wall 4, in which substantially the manufacturing process takes place. In the process chamber 3, there is a container 5 that is open at the top and has a container wall 6. The upper opening of the container 5 forms the respective current working plane 7. The area of this working plane 7 lying within the opening of the container 5 can be used to build the object 2 and is therefore referred to as build field 8.

The container 5 has a base plate 11 which is movable in a vertical direction V and is arranged on a girder 10. This base plate 11 closes off the container 5 at the bottom and thus forms the bottom thereof. The base plate 11 can be formed integrally with the girder 10, but it can be a plate formed separately from the girder 10 and attached to the girder 10 or simply mounted thereon. Depending on the type of specific build-up material, thus, for example, the powder used, and on the manufacturing process, a build platform 12 can be attached to the base plate 11 as a build support plate on which the object 2 is built. In principle, however, the object 2 can also be built on the base plate 11 itself, which then forms the build support plate.

The basic building of the object 2 is carried out by first applying a layer of build-up material 13 on the build platform 12, then—as explained later—selectively solidifying the build-up material 13 with a laser AL at the points which are to form parts of the object 2 to be manufactured, then lowering the base plate 11 by means of the girder 10, thus lowering the build platform 12, and applying a new layer of the build-up material 13 and selectively solidifying it, etc. FIG. 1 illustrates the object 2 built up in the container on the build platform 12 below the working plane 7 in an intermediate state. It already has a plurality of solidified layers, surrounded by build-up material 13 that remains unsolidified. Various materials, preferably powders, in particular metal powders, plastic powders, ceramic powders, sand, filled or mixed powders or even pasty materials can be used as build-up material 13.

Fresh build-up material 15 is located in a storage container 14 of the laser sintering device 1. By means of a coater 16, which can be moved in a horizontal direction H, the build-up material can be applied in the form of a thin layer in the working plane 7 or within the build field 8.

Optionally, an additional radiation heater 17 is located in the process chamber 3. This radiation heater can be used to heat the applied build-up material 13 so that the irradiation device used for selective solidification does not have to introduce too much energy. This means, for example, that a lot of basic energy can already be introduced into the build-up material 13 by means of the radiation heater 17, which basic energy is of course still below the energy required for the build-up material 13 to melt or sinter. For example, an infrared radiator can be used as radiation heater 17.

For selective solidification, the laser sintering device 1 has an irradiation device 20 or, more specifically, an exposure device 20 with a laser 21. This laser 21 generates a laser beam EL which is first fed to a beam shaping device 30 (as input energy beam EL). As will be explained in more detail later in FIG. 9, this beam shaping device 30 is constructed in such a way that it generates from the input energy beam EL an (output) energy beam AL or output laser beam AL for irradiating the build-up material 13 in such a way that the output laser beam has an intensity distribution that is substantially non-rotationally symmetric with respect to a rotation about the beam direction R of the energy beam AL. The energy beam AL is then deflected by a subsequent deflection device 23 (scanner 23) in order to move along the exposure paths or tracks provided according to the exposure strategy in the respective layer to be selectively solidified and to selectively introduce the energy. This means that the impingement surface 22 of the energy beam AL on the build field 8 is moved by means of the scanner 23, wherein the current movement vector or the movement direction S (scan direction) of the impingement surface 22 on the build field 8 can change frequently and quickly. In doing so, this laser beam AL is focused by a focusing device 24 on the working plane 7 in a suitable manner. Here, the irradiation device 20 is preferably located outside the process chamber 3, and the laser beam AL is guided into the process chamber 3 via a coupling window 25 arranged in the chamber wall 4 on the upper side of the process chamber 3.

The irradiation device 20, for example, can comprise not only one but a plurality of lasers. Preferably, these may be gas or solid-state lasers or any other type of laser such as laser diodes, in particular VCSEL (Vertical Cavity Surface Emitting Laser) or VECSEL (Vertical External Cavity Surface Emitting Laser) or a line of these lasers. Particularly preferably, one or more unpolarized single-mode lasers, e.g. a 3 kW fiber laser with a wavelength of 1070 nm, may be used within the scope of the invention.

Furthermore, the laser sintering device 1 includes a sensor arrangement 18, which is suitable for detecting process radiation emitted during the impingement of the laser beam 22 on the build-up material in the working plane. This sensor arrangement 18 operates with spatial resolution, i.e. it is able to detect a kind of emission image of the respective layer. Preferably, an image sensor or camera 18 is used as sensor arrangement 18, which is sufficiently sensitive in the range of the emitted radiation. Alternatively or additionally, one or more sensors might be used to detect optical and/or thermal process radiation, e.g. photodiodes, which detect the electromagnetic radiation emitted by a molten pool when laser beam AL impinges, or temperature sensors to detect emitted thermal radiation (so-called melt pool monitoring). Associating the signal of a sensor which itself does not have a spatial resolution with the coordinates would be possible by associating the coordinates used to control the laser beam with the sensor signal in each case with respect to time. In FIG. 1, the sensor arrangement 18 is arranged inside the process chamber 3. However, it could also be located outside the process chamber 3 and could then detect the process radiation through another window in the process chamber 3.

The signals detected by the sensor arrangement 18 are transferred here as a process chamber sensor data set or layer image SB to a control device 50 of the laser sintering device 1, which also serves to activate the various components of the laser sintering device 1 for the overall control of the additive manufacturing process.

For this purpose, the control device 50 has a control unit 51 which activates the components of the irradiation device 20 via an irradiation control interface 53, namely sends laser control data LS to the laser 21, intensity distribution control data VS to the beam shaping device 30, scan control data SD to the deflection device 23 and focus control data FS to the focusing device 24.

The control unit 51 also activates the radiation heater 17 by means of suitable heater control data HS, the coater 16 by means of coating control data ST, and the movement of the girder by means of girder control data TS, thus controlling the coating thickness.

In addition, the control device 50 includes here a quality data determination device 52 which receives the process space sensor data set SB and based thereon determines quality data QD which can be transferred to the control unit 51, for example, in order to be able to intervene in the additive manufacturing process in a regulating manner.

The control device 50 is coupled here, e.g., to a terminal 56 with a display or the like via a bus 55 or another data connection. An operator can control the control device 50 and thus the entire laser sintering device 1 via this terminal, e.g. by transmitting process control data PSD.

In order to optimize the production process, the control data are generated or, respectively, modified by means of a control data generating device 54, 54' in the manner according the invention in such a way that the activation of the device 1 in at least one specific irradiation mode (in the following it is assumed that it is the core mode in which the inside of an object is to be solidified) takes place such that, on the one hand, the process is carried out as a heat conduction welding process and not as a deep penetration welding process and, on the other hand, the energy beam AL has an optimized, substantially non-rotationally symmetric intensity profile at the impingement surface 22 on the build field.

This control data generating device 54 may be, for example, part of the control device 50 and be implemented there, for example in the form of software components. Such a control data generating device 54 integrated in the control device 50 can take over the process control data PSD, for example, and modify them correspondingly such that an energy beam AL with an optimized beam profile is generated and then transmit the correspondingly modified control data PSD to the control unit 51. The modified control data PSD comprise in particular modified exposure control data BSD, but optionally also other modified control data, such as modified coating control data ST or girder control data TS, in order to select a suitable coating thickness. As an alternative it would also be possible to modify only the exposure control data BSD in the control data generating device 54 and to transfer them to the control unit 51 so that the irradiation control interface 53 works with the modified exposure control data BSD.

However, it would also be possible that the control data generating device 54' is implemented on an external computer unit, here, for example, the terminal 56, and generates in advance process control data PSD with correspondingly suitable exposure control data BSD with which device 1 is activated in such a way that the optimized intensity profile is achieved in order to carry out the process as a heat conduction welding process. In this case, the internal control data generating device 54 provided here in the control device 50 could also be dispensed with.

As already mentioned, the process control data PSD, in particular exposure control data BSD, generated or modified by the control data generating device 54, 54', can also be regarded as setpoint values which are then used in the control unit 51 for a feedback control process, wherein, e.g. (as one possibility), the quality data QD can also be included as actual values.

It should be noted again at this point that the present invention is not limited to such a laser sintering device 1. It can be applied to any other method for generatively or additively producing a three-dimensional object by applying and selectively solidifying a build-up material, in particular layer by layer, wherein an energy beam for solidifying is emitted onto the build-up material to be solidified. Accordingly, the irradiation device may not only be a laser, as described here, but any device could be used with which energy in the form of wave or particle radiation can be selectively applied to or introduced into the build-up material. For example, instead of a laser, another light source, an electron beam etc. could be used.

Although only a single object 2 is illustrated in FIG. 1, it is possible and usually common practice to produce several objects in parallel in the process chamber 3 or container 5. An example of this is given later. For this purpose, the build-up material is scanned layer by layer by the energy beam at positions which correspond to the cross-sections of the objects in the respective layer.

Figure 2:
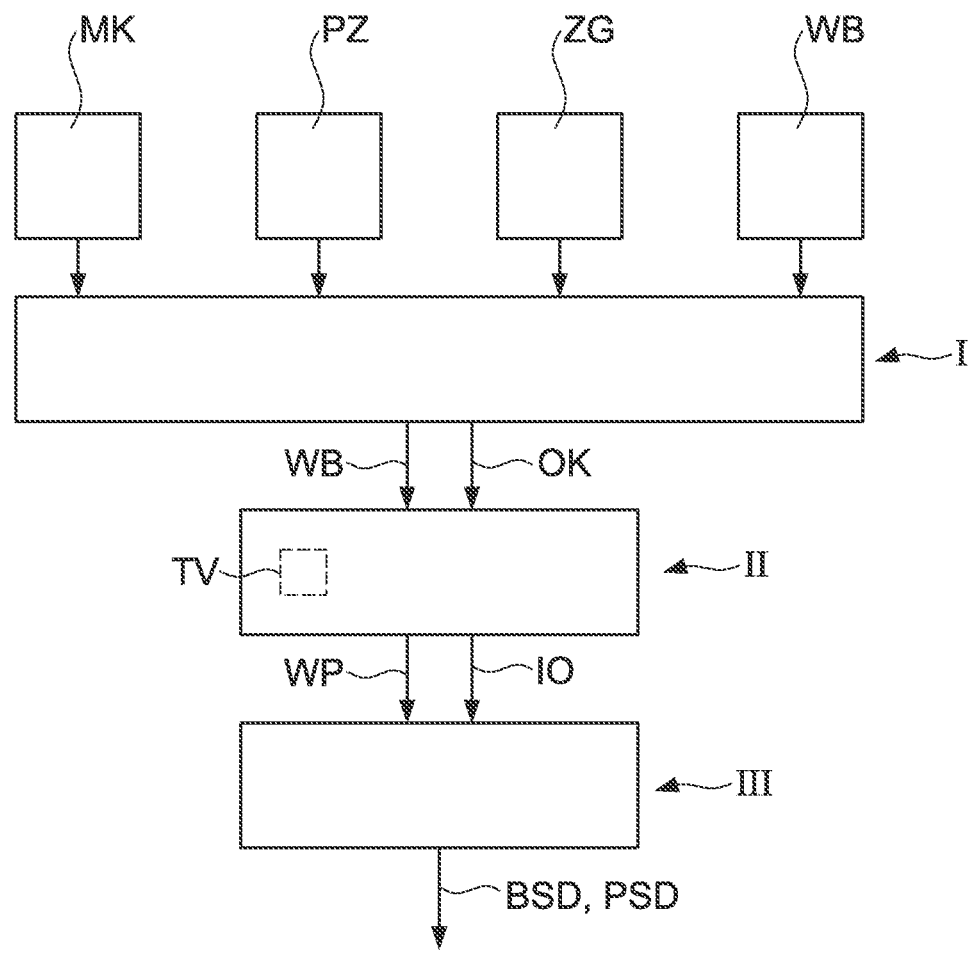
FIG. 2 is a flow chart of a possible process flow of an exemplary embodiment of a production method according to the invention.
Figure 3:
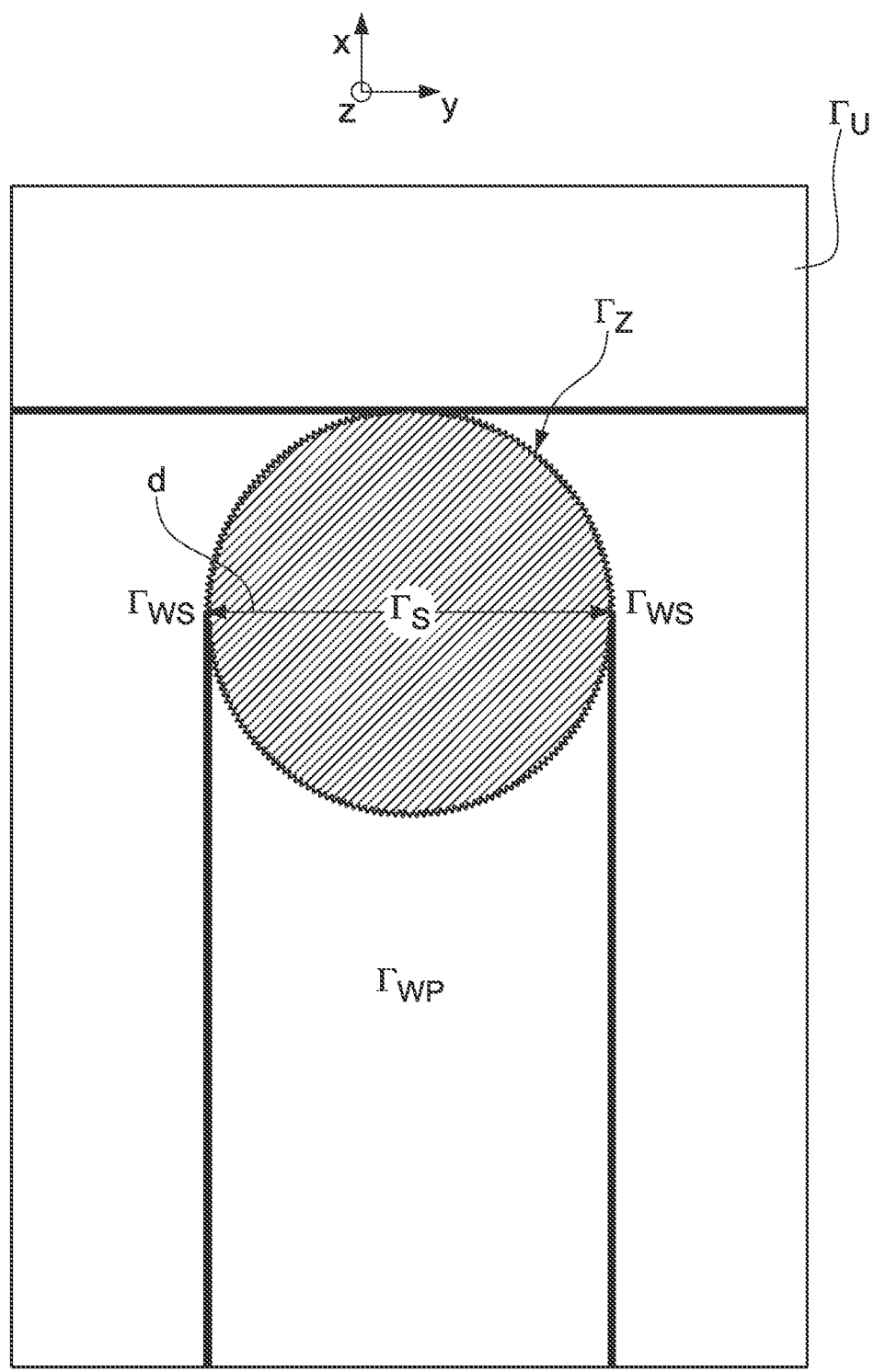
FIGS. 3 to 7 are schematic illustrations of exemplary embodiments for dividing a target area and its environment into different process zones.

The procedure for creating an optimized intensity profile IO as well as further optimized process parameters WP, such as the scanning speed, focus, layer thickness etc., as they could be determined by the control data generating device 54, 54', for example, is explained in the following based on of FIG. 2.

In a first step I, certain optimization criteria OK as well as secondary and boundary conditions WB are first defined.

As input values, material characteristic values MK of the build-up material can be provided here, such as the above-described characteristic values for describing the phase transformation of the build-up material, cooling rates and temperature holding points, thermal conduction coefficients, heat capacity, density, thermal conductivity, surface tension, phase transformation enthalpies, boiling or evaporation temperatures, melting temperatures, etc. They can be provided in the form of functions and/or tables or even as individual values. In principle, it is also possible, for example, to receive process data containing information such as type or product designations of the materials used, etc., and the appropriate material characteristic values are automatically selected accordingly. It would also be possible to enter the material and/or the material characteristic values via a user interface.

In addition, process zones PZ can be defined in this step, for example, also by a user or by extraction from already pre-defined control protocols, etc. Possible process zones PZ will be explained in more detail later by means of FIGS. 3 to 7.

Furthermore, target valuables ZG can be specified, such as the target cooling rate or optimum temperature holding points, desired local target temperature gradients for different process zones, a target molten pool depth, a target surface quality, a target build rate, deviation from the maximum temperature that would still be allowed, and target molten pool shapes, etc.

Finally, certain boundary and/or secondary conditions WB can also be specified directly, if desired. This data can also be extracted from pre-defined or existing control protocols, for example.

The optimization criteria OK and boundary and/or auxiliary conditions WB determined in step I regarding an optimal local temperature distribution TV (target temperature distribution) are then entered in a further step II into an optimization process in which an optimized intensity profile IO as well as further process parameters WP are determined, upon fulfillment of which the target temperature distribution TV in the respective current target area of the build-up material achieves the optimization criteria as good as possible and also adheres to the secondary conditions and definitely also to the boundary conditions as good as possible. The further process parameters WP determined in this optimization process can comprise, for example, the scanning speed and the layer thickness, which are ideal in combination with the optimized intensity profile IO. An example of such an optimization process will be explained later by means of FIG. 8.

The optimized intensity profile IO and the further process parameters WP are then used in step III to generate the control data PSD, BSD, or, if parts of these control data are already available, to modify them accordingly so that an energy beam with the optimized intensity profile IO appears in each case at the impingement surface 22 on the build field 8 and the further process parameters WP are fulfilled during irradiation or build-up layer of the layer.

In the following, a possible calculation of an optimized intensity profile IO, which would result in the fact that in a laser welding process, the welding process would be carried out according to the principle of heat conduction welding, is described merely as an example. It should be noted at this point that the entire method can also be carried out in a similar way for other energy beams.

For this purpose, first, a plane surface is defined in which a moving orthogonal coordinate system x, y, z exists, the origin of which is always in the center of the moving laser beam AL. Here, the z-direction of this coordinate system is perpendicular to the working plane. Accordingly, the x- and y-coordinates are perpendicular to the z-direction. The coordinate system is defined such that it rotates with the laser beam AL so that the laser beam always moves in the positive x-direction, i.e. the projection of the coordinate x onto the build field 8 corresponds to the scan direction S.

The (x-/y-) plane defined in this coordinate system is virtually divided into spatially different process zones in the area around the impingement surface 22 of the energy beam AL on the build field 8, i.e. in a target area $\Gamma_Z$ as well as a certain environment $\Gamma_U$ around the target area $\Gamma_Z$. The definition of the optimization criteria OK and/or secondary and/or boundary conditions WB is then carried out in relation to these process zones.

A first area or a first process zone $\Gamma_S$ could be designated as melting zone $\Gamma_S$. This can be the area in which the material or build-up material is in the molten state. If required, this melting zone $\Gamma_S$ can in turn be divided into an active melting zone $\Gamma_{SA}$ and a passive melting zone $\Gamma_{SP}$ (as different first and second process zones) (cf. FIGS. 3 and 4). The active area is in each case heated by the laser beam AL, the passive area is not.

Furthermore, a third area or a third process zone $\Gamma_{WS}$ can be defined, which comprises the heat-affected zone $\Gamma_{WS}$ laterally next to the laser beam or perpendicular to the respective movement direction x. A fourth heat-affected zone, which directly follows the laser beam, can also be defined as a trailing heat-affected zone $\Gamma_{WP}$.

Figure 5:
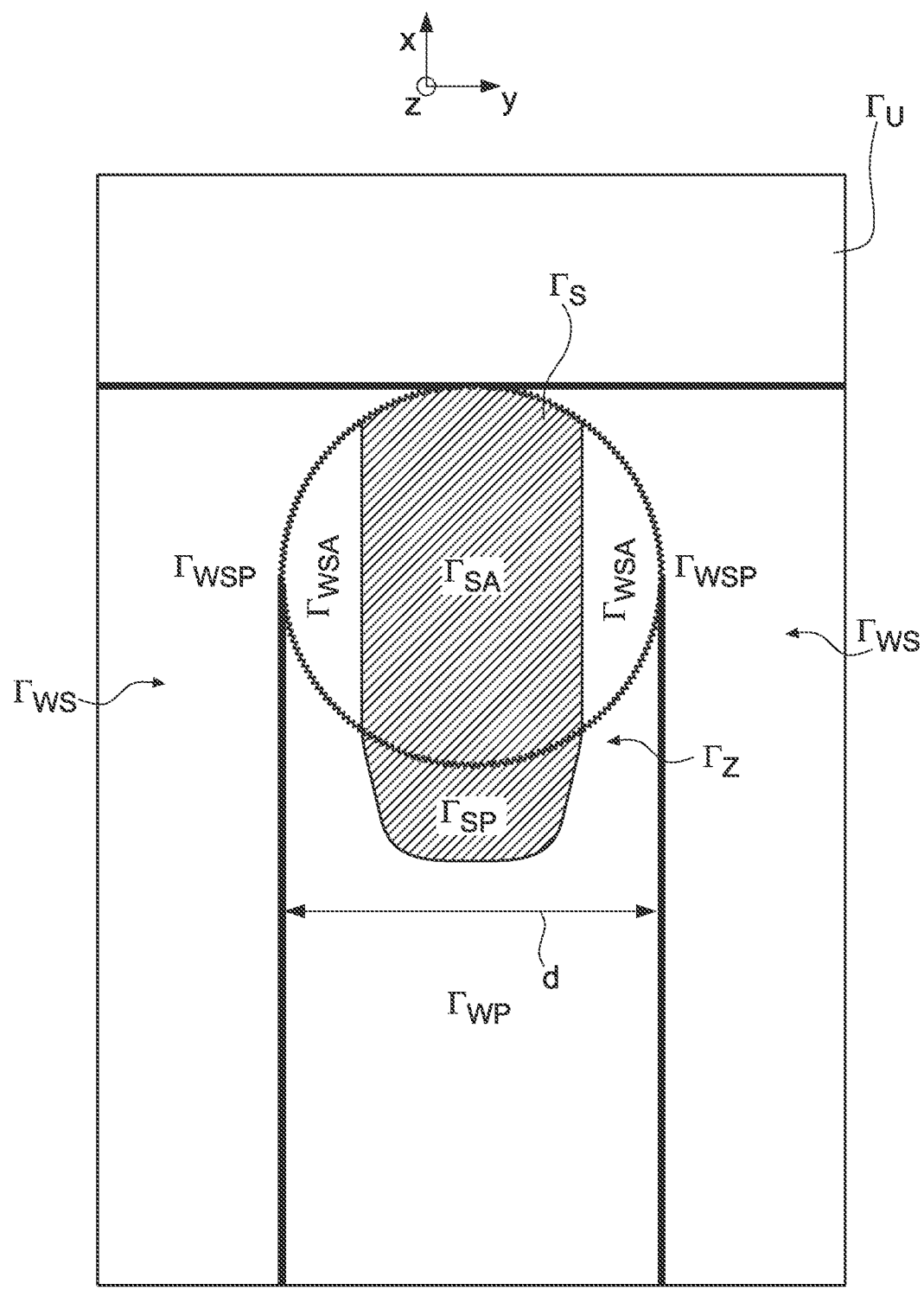
Figure 6:
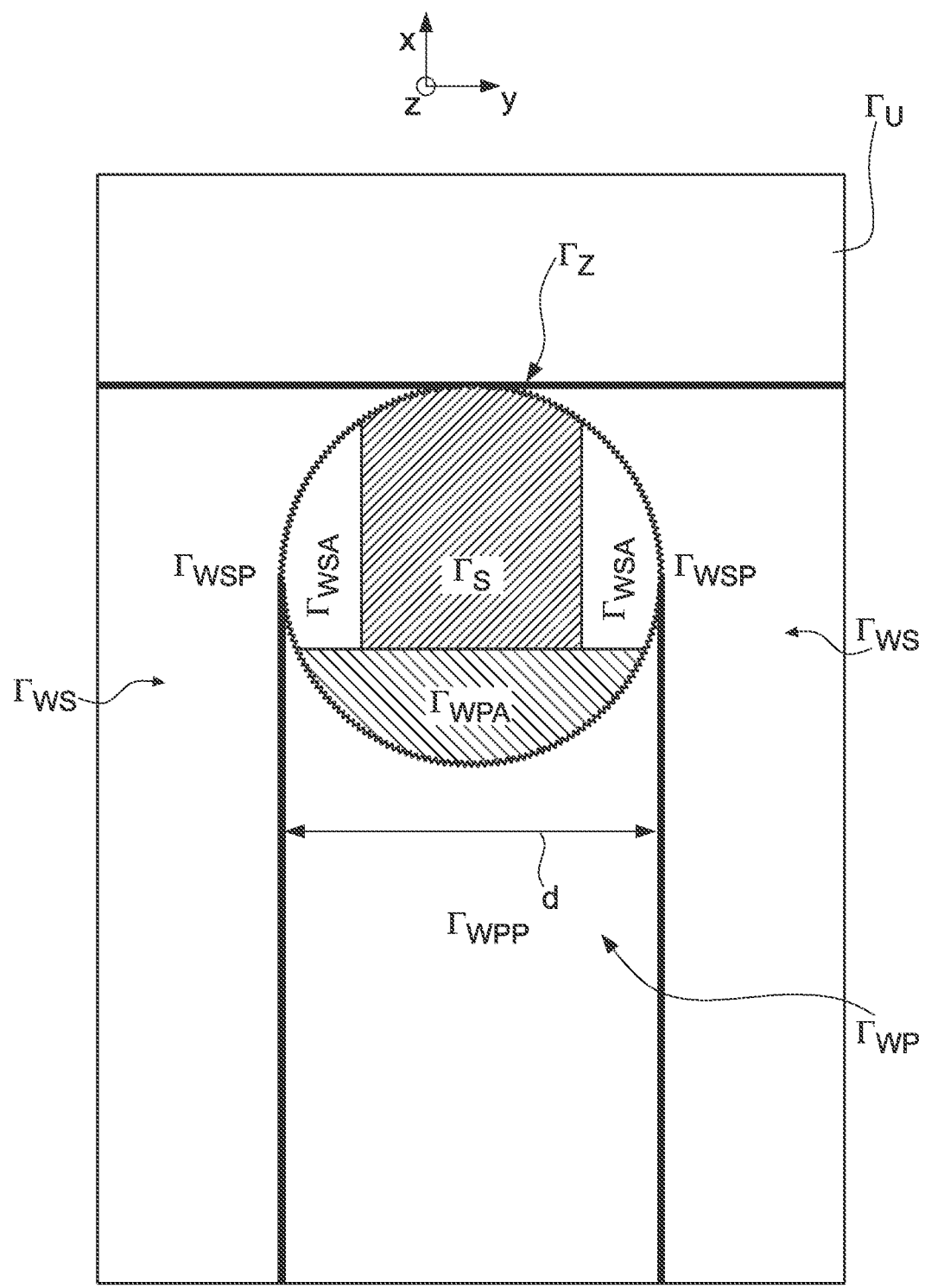
Figure 7:
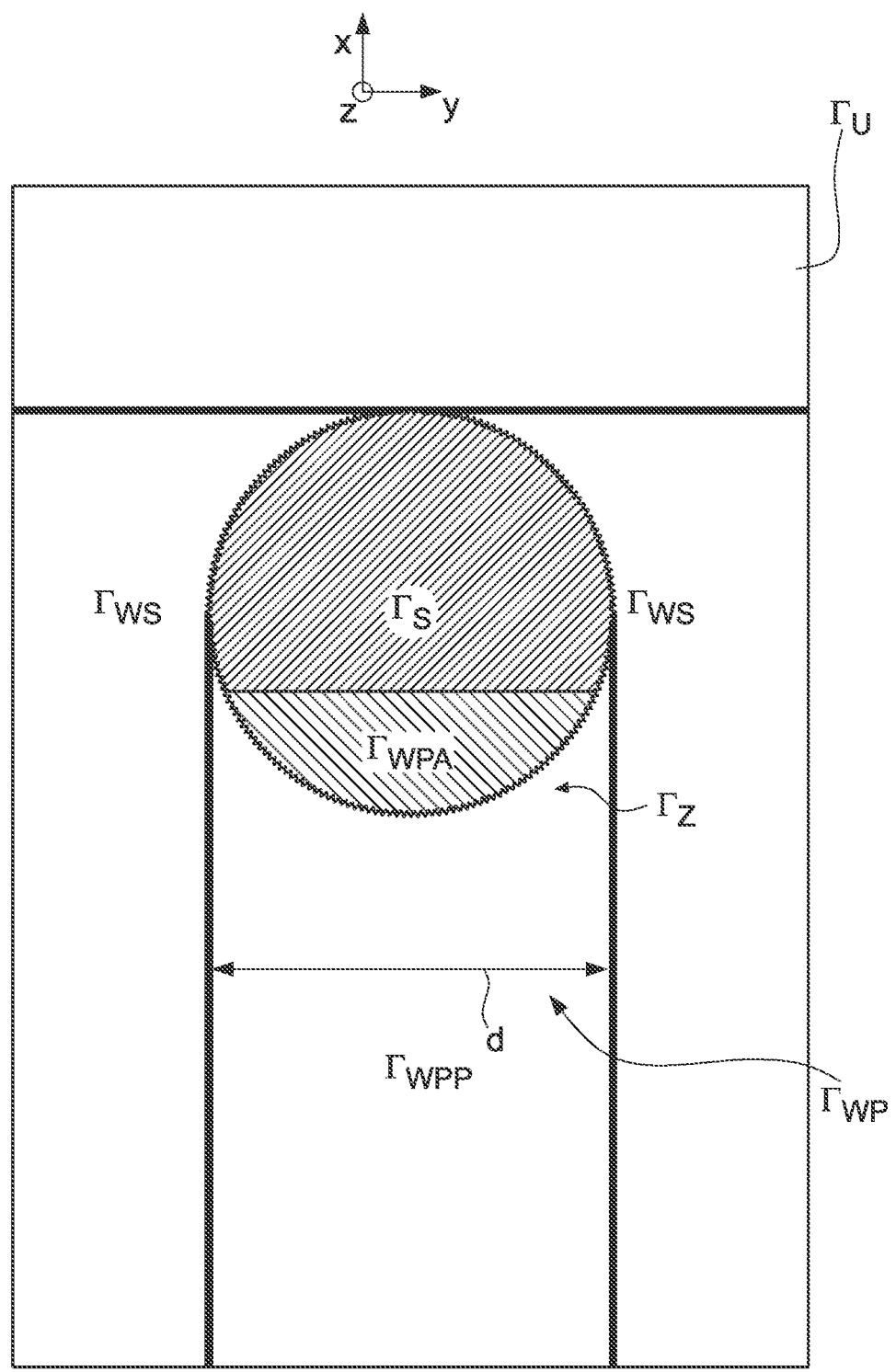

Instead of only one lateral heat-affected zone $\Gamma_{WS}$ and/or a trailing heat-affected zone $\Gamma_{WP}$, it is also possible, if desired, to define, in each case analogous to the melting zone, respective active heat-affected zones $\Gamma_{WSA}$, $\Gamma_{WSP}$ and corresponding passive heat-affected zones $\Gamma_{WPA}$, $\Gamma_{WPP}$, as exemplified in FIGS. 5 to 7.

The remaining area, in particular e.g. the area in front of the laser beam AL as viewed in the scan direction, is only referred to as the environment $\Gamma_U$. As can be seen in particular from FIGS. 5 to 7, the beam expansion d of the laser beam AL does not have to coincide with the active melting zone $\Gamma_{SA}$ and can be larger, for example, if, for example, it is desired to actively influence the heat-affected zones, i.e. here the process zones $\Gamma_{WSA}$ or $\Gamma_{WPA}$. Thus, for example, the cooling rate and the temperature gradient can be determined more precisely in these regions. However, the laser beam AL should cover all "actively influenced" areas.

Figure 4:
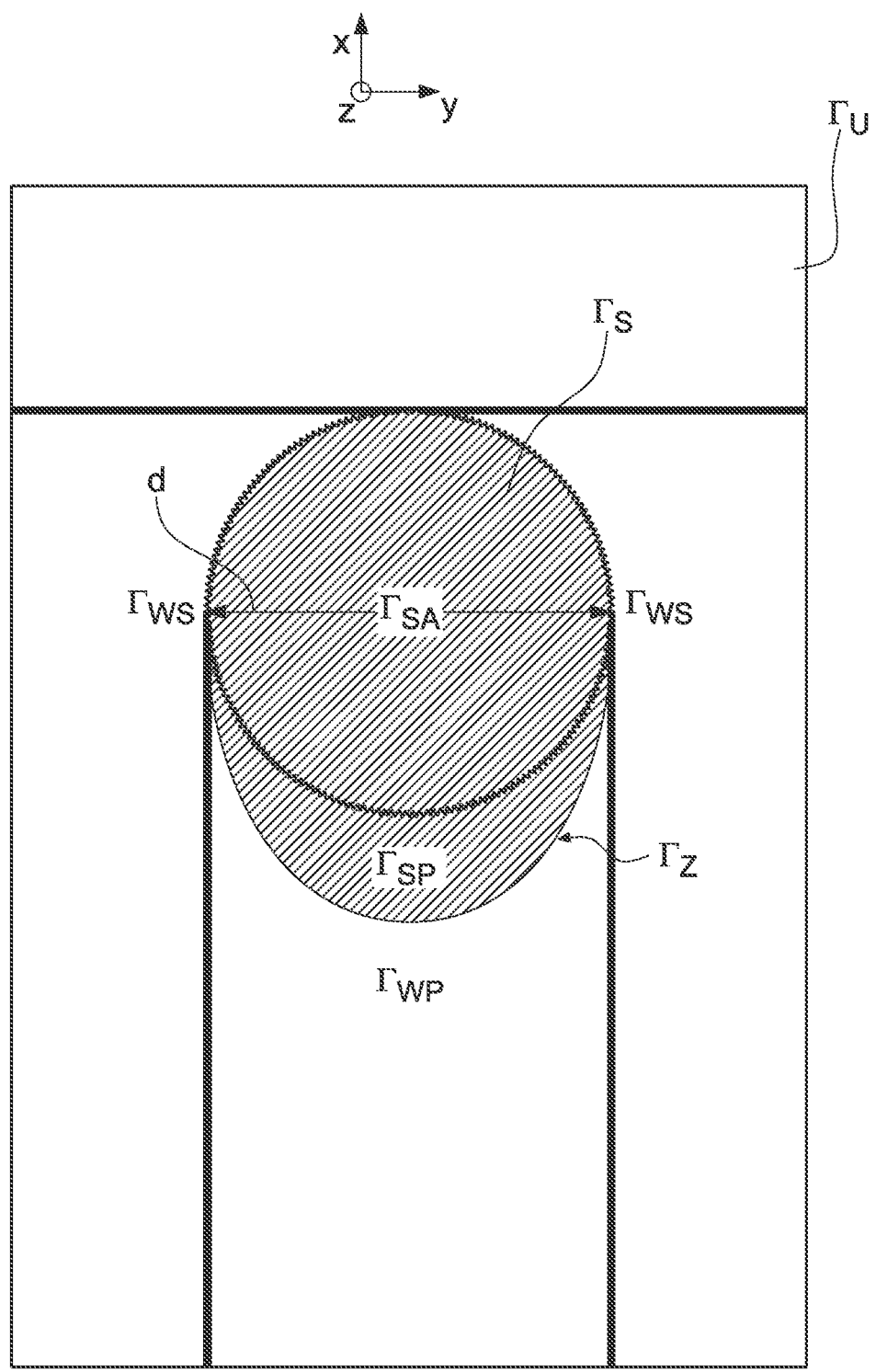

For a variant with a subdivision into process zones $\Gamma_{SA}$, $\Gamma_{SP}$, $\Gamma_{WS}$, $\Gamma_{WP}$, as exemplified in FIG. 4, a possible optimization is explained in more detail below. For other subdivisions, similar definitions and processes adapted accordingly would be used.

First, the following variables can be determined or specified for the optimization from the material data of the existing workpiece:

The cooling rate T. This rate depends on the material, i.e. which material properties are desired, e.g. grain size, martensitic phase transformation etc.

The maximum acceptable temperature TV. This is usually the evaporation temperature of the material used or, as already mentioned, the lowest evaporation temperature in the case of a mixture of several materials.

The melting temperature $T_M$. Here again, the lowest melting temperature would have to be specified in the case of a mixture of materials.

A target temperature gradient in the melting zone $\Gamma_S$, which can be mathematically defined as follows, for example:

$$\nabla T_S(x, y) = \begin{pmatrix} \nabla T_{Sx}(x, y) \\ \nabla T_{Sy}(x, y) \end{pmatrix} \quad (1)$$

$T_S(x,y)$ corresponds here to the temperature in the target area of the laser beam AL at the position (x,y) on the build field 8, $\nabla T_S(x,y)$ corresponds here to the derivative of the temperature in the target area of the laser beam AL at the position (x,y) on the build field 8 and $\nabla T_{Sx}(x,y)$, $\nabla T_{Sy}(x,y)$ are the derivatives in x- and y-direction.

A target temperature gradient in the lateral heat-affected zone $\Gamma_S$, which could be mathematically defined as follows:

$$\nabla T_{WS}(x, y) = \begin{pmatrix} \nabla T_{WSx}(x, y) \\ \nabla T_{WSy}(x, y) \end{pmatrix} \quad (2)$$

$T_{WS}(x,y)$ corresponds here to the temperature in the target area of the laser beam AL at the position (x,y) on the build field 8, $\nabla T_{WS}(x,y)$ corresponds here to the derivative of the temperature in the target area of the laser beam AL at the position (x,y) on the build field 8 and $\nabla T_{WSx}$ (x,y), $\nabla T_{WSy}$ (x,y) are the derivatives in x- and y-direction.

Analogous to this target temperature gradient for the lateral heat-affected zone $\Gamma_{WS}$, a target temperature gradient could also be defined for the trailing heat-affected zone $\Gamma_{WP}$.

The temperature gradients defined above are all predetermined desired parameters. For example, a maximum temperature gradient could be given depending on the material, since the respective temperature gradient determines the thermocapillary convection.

In particular, the following aspects can also be taken into account when specifying the target temperature gradients: In principle, stresses are created by the temperature gradients between the solid body and the weld seam after their solidification and cooling. These stresses can become so high that they can significantly deteriorate the quality of the component and in extreme cases even lead to cracks. Influencing the size and distribution of these stresses to sufficiently reduce them, e.g. by adjusting exposure parameter and beam parameter, can therefore increase component quality. One objective can be to reduce the temperature gradients or keep them sufficiently small. Since the temperature at the melt/solid body interface is fixed for a given material, this can be achieved by suitably increasing the temperature of the solid body at least locally, i.e. at the position where the weld seam is to bond (the bonding zone), in advance or in parallel. This could also be achieved by modifying the intensity profile by configuring the intensity profile such that the bonding zone would also be irradiated, namely precisely with an amount of energy that would produce there the desired temperature distribution. For example, the active heat-affected zones $\Gamma_{WSA}$, as shown in FIGS. 5 and 6, can be used for this purpose by specifically defining these process zones.

In the following, some mathematical equations are presented as examples of the variant for defining the process zones according to FIG. 4, with which optimization goals or optimization criteria and secondary conditions as well as boundary conditions can be defined. Equations (3) to (6) show possible optimization goals or secondary conditions and equations (7) to (13) show secondary conditions or boundary conditions that should be fulfilled:

For example, the following optimization goal can be defined for all points x, y within the melting zone $\Gamma_S$:

$$\min\left(w_1(x, y)(T_v - T(I, x, y)) + w_2(x, y)\sqrt{\left(\frac{\partial T(x, y)}{\partial x} - \nabla T_{Sx}(x, y)\right)^2 + \left(\frac{\partial T(x, y)}{\partial y} - \nabla T_{Sy}(x, y)\right)^2}\right) \quad (3)$$

Equation (3) thus describes the optimization of the target temperature distribution T(I, x,y) in the melting zone $\Gamma_S$. The parameter I in the designation T(I, x,y) symbolizes the dependency of the target temperature distribution T(I, x,y) on the intensity distribution I(x,y) of the energy beam which is actually to be optimized. The relationship between T(I, x,y) and I(x,y) can be defined, for example, via a coupling condition of the two variables, as given later in equation (10). In principle, equation (3) or the other optimization goals could also be described directly by a dependency on the intensity distribution I(x,y) instead of the target temperature distribution T(I, x,y), but this would result in the formulas becoming very complex. Depending on the selected optimization method, the relationship can also be considered in a simulation step (which can simulate which intensity distribution I(x,y) with which further parameters would lead to which target temperature distribution T(I, x,y)) in an iteratively working optimization process. In this respect, the parameter I is not always mentioned hereinafter in the target temperature distribution T(x,y), even if the dependency between the target temperature distribution T(x, y) and the intensity distribution I(x,y) is always given.

In the first term of equation (3), the difference between the evaporation temperature $T_V$ and the local temperature T(x,y) at the molten pool surface to be optimized is the target function to be minimized. This ensures that the temperature T(x,y) in the melting zone $\Gamma_S$ is as close as possible to the evaporation temperature TV. However, it should still be ensured by a boundary condition not described in equation (3) that the temperature T(x,y) at the molten pool surface remains below the evaporation temperature $T_V$ everywhere, so that the process window of heat conduction welding is also fulfilled (see later equation (7)).

The second part in equation (3) defines the spatial variations of the temperature T(x,y) at the molten pool surface as a target function. Here, the error is to be minimized to a desired spatial fluctuation, i.e. a desired temperature gradient $\nabla T_{S(x,y)}$ according to equation (1) is specified, which is to be fulfilled. If, for example, the goal were to suppress any thermocapillary convection in the molten pool surface, the components of the temperature gradient $\nabla T_{S(x,y)}$ could be set to zero. If, on the other hand, a desired flow in the molten pool and thus a mass-carrying heat transport is to be induced, the temperature gradient $\nabla T_{S(x,y)}$ necessary for inducing this flow can be determined at any point x, y in the melt zone via the temperature dependency of the surface tension. This can be done, for example, with the help of numerical calculations for solving the Navier-Stokes equations. In a mathematical model used for this purpose, thermocapillary convection can then be taken into account. In addition, the heat transport can also be modelled in such a model. Such models can be used, for example, in the above mentioned simulation step in an iteratively working optimization process.

By means of the weighting factors $w_1$, $w_2$ in equation (3) it can be specified—e.g. depending on the sensitivity of the material with respect to the temperature gradient—whether more value should be placed on the proximity of the current temperature to the evaporation temperature, thus, the melt is as hot as possible, or the temperature gradients should be taken into account more strongly.

The optimization of the temperature distribution in the lateral heat-affected zone $\Gamma_{WS}$ can be defined by the following equation:

$$\min\left(\sqrt{\left(\frac{\partial T(x, y)}{\partial x} - \nabla T_{WSx}(x, y)\right)^2 + \left(\frac{\partial T(x, y)}{\partial y} - \nabla T_{WSy}(x, y)^2\right)}\right) \quad (4)$$

In this heat-affected zone $\Gamma_{WS}$ too, a desired temperature profile can be specified via the temperature gradient $\nabla T_{WS(x,y)}$. This desired profile can then be selected such that residual stresses, which can form due to excessive local temperature gradients, are reduced. From the permissible temperature gradients for reducing residual stresses, the components for the temperature gradient $\nabla T_{WS(x,y)}$ at each point x,y and the lateral heat-affected zone $\Gamma_{WS}$ are determined.

An optimization criterion for the temperature distribution T(x,y) for locations x,y in the trailing heat-affected zone $\Gamma_{WP}$ can be defined, for example, by the following equation:

$$\min\left(\frac{\partial T(x, y)}{\partial x} v - \dot{T}\right) \quad (5)$$

Here, the cooling rate $\dot{T}$ is expressed by the product of the spatial temperature gradient $\partial T(x,y)/\partial x$ in the movement direction and the scanning speed v. If a point is assumed to have ax been located in the center of the laser at a certain point in time, this point cools down for an external observer not moving along at a cooling rate $\dot{T}$. This cooling rate shall be no different from the cooling rate from the point of view of an observer moving along, which can be expressed by the spatial or local gradient $\partial T(x,y)/\partial x$, multiplied by the scanning speed v.

In addition, the scanning speed v can be an optimization criterion, since it allows to specify the time in which a workpiece is fabricated as well as the power required for the process which results from the integral of the target intensity distribution (or the optimized intensity distribution) I(x,y) of the laser beam. If, e.g., the minimum required power becomes an optimization parameter, the system can be made more energy-efficient.

For this purpose, it can be specified for all process zones or areas that the intensity distribution I(x,y) of the laser beam must fulfill the following condition:

$$\min(w_3 \iint I(x,y) dy dx - w_4 v) \quad (6)$$

The outer integral covers all x-coordinate values and the inner integral all y-coordinate values, i.e. the double integral is the power of the energy beam. In other words, the integral of the intensity I(x,y), thus the power of the energy beam, must be minimized and the scanning speed v must be maximized in order to achieve the highest possible build rate at the lowest energy consumption. Since the two conditions are contradictory, a Pareto optimum is found with the aid of the optimization condition (6), wherein by means of the weighting factors w3, w4, the weighting can be placed more on one or the other target, depending on the needs. For example, it may be more favorable to operate a laser with more power in order to be able to achieve the highest possible speed and thus a shorter build time. A holistic approach is useful.

It should be noted in this context that this equation is only a greatly simplified version. For example, it might make sense here to consider further factors, e.g. factors describing costs of operating the machine etc.

Furthermore, the following secondary conditions can be defined for the optimization method:

$$T_V - T(x,y) \geq 0 \quad (7)$$

This is the secondary condition already mentioned above that the current local temperature T(x,y) should never be higher than the lowest evaporation temperature $T_V$ in order to remain in a heat conduction welding process.

$$T(x,y) - T_M \geq 0 \quad (8)$$

Hereby it is defined in a similar way that the temperature T(x,y) should always be greater than or equal to the melting temperature TM.

Furthermore, for the locations x,y in the melting zone $\Gamma_S$ and the lateral heat-affected zone $\Gamma_{WS}$ can be defined (exemplary for a section in y-direction):

$$\lim_{y \in \Gamma_S} T(y) - \lim_{y \in \Gamma_{WS}} T(y) > 0 \quad (9)$$

This secondary condition ensures that the temperatures at the boundaries of the two process zones, here between the melting zone $\Gamma_S$ and the heat-affected zone $\Gamma_{WS}$, should be as identical as possible, since there is no temperature jump in the surface. Analogously, boundary conditions can be defined for other process zone transitions.

A further secondary condition can ensure that all energy entering the process flows downwards:

$$\alpha I(x, y) - \lambda(T(x, y, z)) \frac{\partial T(x, y, z)}{\partial z} = 0 \quad (10)$$

This is ensured by the term $$\lambda(T(x, y, z)) \frac{\partial T(x, y, z)}{\partial z} \quad (11)$$

which defines the flow of energy into the region $\Omega$ below the surface. $\alpha$ is the absorbency of the build-up material and $\lambda$ is the thermal conductivity thereof.

Condition (10) should apply to all locations x,y in the active zones, i.e. in the melting zone $\Gamma_S$ and optionally also in the "active" heat-affected zones $\Gamma_{WSA}$, $\Gamma_{WPA}$, if these have been specified (e.g. if the process zones have been defined as in FIG. 6).

The required variables for equations (10) and (11) can be determined for all locations x,y,z in the volume $\Omega$, e.g., by solving the heat conduction equation $$c_{p,\mathit{eff}}(T(x,y,z))\rho(T(x,y,z))\dot{T}(x,y,z) = \nabla \cdot (\lambda(T(x,y,z)) \cdot \nabla T(x,y,z)) \quad (12)$$

wherein $\dot{T}(x,y,z)$ is the time derivative of T(x,y,z). Here, $c_{p,\mathit{eff}}(T(x,y,z))$ is the temperature-dependent effective heat capacity, which can also take into account the heat of transformation of all phase transformations, $\rho(T(x,y,z))$ denotes the temperature-dependent density, and the temperature-dependent thermal conductivity is given by $\lambda(T(x,y,z))$. $\nabla T(x,y,z)$ corresponds to the derivative of the temperature T(x,y,z).

Finally, a minimum welding penetration depth Mil, which must be achieved in order to achieve a connection of a layer to a previous layer, can preferably also be specified. This can be defined by the equation $$t_{min} - t_{ist} < 0 \quad (13)$$

wherein $t_{ist}$ is the actual welding depth. A further secondary condition can be that the scanning speed v is always greater than 0.

Accordingly, optimization criteria and secondary conditions as well as boundary conditions can be defined for other subdivisions in process zones. Which of the above-mentioned conditions are included as optimization criteria, as secondary conditions or boundary conditions, or whether others are added, depends in each case on the concrete manufacturing task (e.g. on the machine used, the build-up material, the manufactured product and its requirements, etc.). Usually, the above-mentioned boundary conditions must be selected in particular in accordance with the respective machine or device for additive manufacturing of the products, in which the process is then actually carried out.

Solving the equation 12 can also be achieved by numerical or empirical analysis. Also, as part of an adaptive control or regulation, the equation can be compared with an in-situ measurement (e.g. by means of monitoring) and the profile can be adapted again during the process by solving the optimization problem again.

Figure 8:
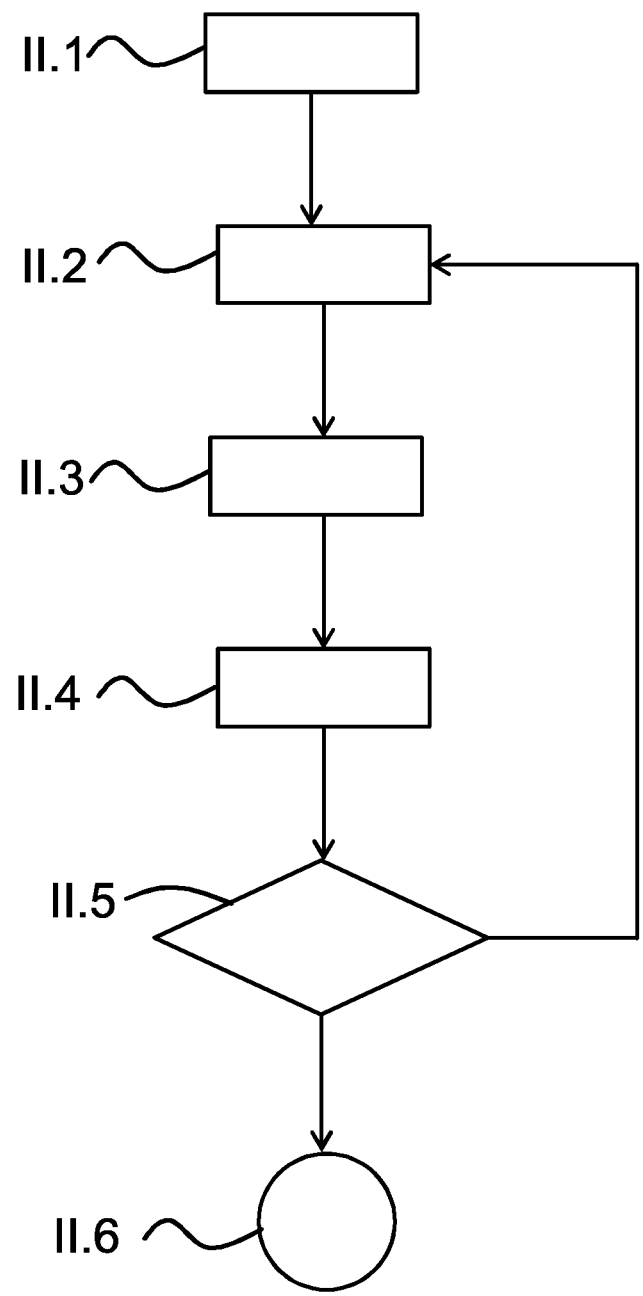
FIG. 8 is a flow chart of a possible process flow of an exemplary embodiment of an optimization method within a production method according to the invention.

A preferred example of a suitable optimization method is explained below based on FIG. 8. This iterative method could be carried out, for example, as part of step II of the method shown in FIG. 2.

In a first step II.1, initial values for an (initial) intensity distribution I(x,y) are estimated.

In a further step II.2, the heat conduction equation (12) is then solved, wherein the secondary conditions must be fulfilled according to equation (10). Here, equation (10) contains the term αI(x,y), i.e. the (initial) intensity distribution I(x,y) from step II.1. The heat conduction equation (12) describes the dissipation of the thermal energy introduced into the material by the laser at the given intensity distribution I(x,y) from the impingement surface into the surrounding material. By solving the equation, the temperature profile T(x,y,z) occurring at the build field for the respective intensity distribution I(x,y) of the laser in the material is thus obtained. In the first run of the iteration, an initial temperature profile T(x,y,z) in the material is virtually calculated from the initial intensity distribution I(x,y) of the laser.

Then, in a step II.3, a (first) optimization run of the temperature profile T(x,y,z) is performed, wherein "correction values" for the temperature profile T(x,y,z) are sought with which the temperature profile T(x,y,z) fulfills, among other things, the optimization criteria and conditions defined according to equations (3) to (9) above as good as possible.

In step II.4 it is then checked whether steps II.2 and II.3 have been repeated at least twice and a termination criterion is then checked, wherein this criterion can be a convergence criterion, for example, as to whether in the current run of the iteration the temperature profile T(x,y,z) and/or the intensity distribution I(x,y) have changed with respect to the previous run (wherein "current" describes a run n and "previous" describes a run n−1) by a previously defined tolerance value (residual). If this is not the case or if steps II.2 and II.3 have been run through only once, a return to step II.2 takes place and the iteration loop is run through again with the current intensity distribution I(x,y).

Otherwise, the optimization method in step II.5 is finished and the optimal intensity distribution I(x,y) being sought for is available.

In the procedure described above, as mentioned, in particular the density, the effective heat capacity, the thermal conductivity, the maximum tolerable temperature, the melting temperature, the temperature gradient in the heat-affected zone and the cooling rate can be specified as fixed parameters. Furthermore, the minimum welding penetration depth, which is determined by the specified layer height of the process, is also included here as a process parameter. During optimization, the power required by the system can be minimized and the volume re-melted per time unit can be maximized. The free variables here are the intensity distribution and the scanning speed. However, any other criteria and input values can also be used if desired, depending in each case on the machine used, the material used and other conditions and requirements. As part of the optimization it is theoretically also possible, for example, to consider the alloy composition within the respective material specification as a parameter to be optimized, as it influences the material characteristics and the costs, just to give one example.

With the approach described above, at least a significant reduction of evaporation or even a complete elimination of evaporation can be achieved. Thereby, the power coupled into the material per laser beam can be increased by about one order of magnitude without compromising detail resolution. In doing so, a comparable component quality is achieved, although the component costs can be reduced considerably. A further advantage is that this method can also be used for already known systems with only one or a few exposure devices or scanners/laser beams.

A beam shaping device 30 described below based on FIG. 9 could be used not only for equipping new machines or devices for additive manufacturing of manufactured products, but in particular also for retrofitting already existing machines or devices that have a conventional exposure device that generates a substantially rotationally symmetric Gaussian-shaped energy beam.

Figure 9:
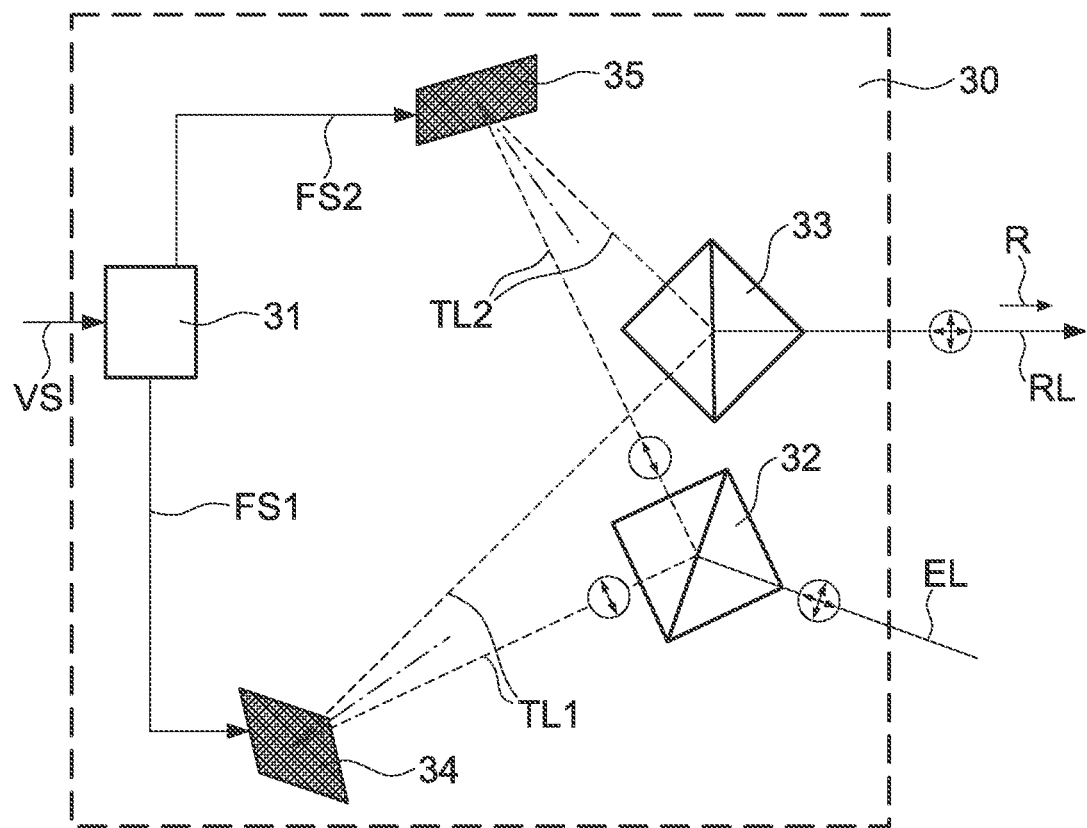
FIG. 9 is a schematic illustration of the functional arrangement of components of an exemplary embodiment of a beam shaping device to give an input energy beam a desired intensity profile.

The exemplary embodiment of a suitable beam shaping device 30 shown in FIG. 9 receives an input energy beam EL, for example a laser beam from laser 21 mentioned above in connection with FIG. 1. This input energy beam EL has a substantially rotationally symmetric intensity distribution, for example a Gaussian profile. In the beam shaping device 30, the intensity distribution of this input energy beam EL is then modified in such a way that, after leaving the beam shaping device 30, it is substantially non-rotationally symmetric with respect to rotation about the beam axis R or beam direction. For example, an elliptical intensity distribution can be achieved here, which has a higher intensity on one side than on another side. Preferably, the intensity distribution of the energy beam AL can have an axial symmetry, the axis of symmetry of which runs along the movement vector of the impingement surface 22 of the energy beam AL on the build field 8. A corresponding example of an elliptical intensity distribution is also shown in the above-mentioned publication by Tien T. Roehling et al. However, any other substantially non-rotationally symmetric intensity distribution can also be achieved with this beam shaping device 30.

The beam shaping device 30 has on the input side a beam splitter 32 in the form of a thin-film polarizer 32, which splits the input energy beam EL into two linearly polarized partial beams TL1, TL2. Each of these linearly polarized partial beams TL1, TL2 is directed to its own beam shaping element 34, 35, which are LCoS micro-displays 34 and 35, respectively. These LCoS micro-displays 34, 35 are responsible for the actual beam shaping. These micro-displays are passive DOEs that operate in a reflective manner and change the wavefront of the incident partial beam TL1, TL2 by local modulation of phase and/or amplitude. For this purpose, the LCoS micro-displays 34, 35 are activated with corresponding partial shape control signals FS1, FS2, which are transmitted to the two LCoS micro-displays 34, 35 via a control interface 31. This control interface 31 receives at the input, e.g., the intensity distribution control data VS from the irradiation control interface 53 of the control device 50, as described in connection with FIG. 1.

The two correspondingly modulated partial beams TL1, TL 2 are then recombined in a beam combiner 33, which likewise is a thin-film polarizer 33—as in the case of the beam splitter 32. At the output of the beam combiner 33 there is then an output laser beam AL shaped in the desired way with respect to the intensity distribution, which output laser beam is again randomly polarized.

The intensity profiles of the partial beams or phase profiles set on the two LCoS micro displays 34, 35 are preferably the same. However, to achieve certain optical secondary criteria, e.g. a maximum intensity on optical elements of the beam shaping device, they can also be set differently in such a way that the desired intensity profile is nevertheless achieved in the target plane.

The laser beam AL modified in this way by the beam shaping device 30, i.e. the laser beam provided with the non-rotationally symmetric optimized intensity profile IO, is then transmitted to the scanner 23, as shown schematically in FIG. 1, and from there to the build field 8.

Finally, it should be noted once again that the devices described in detail above are merely exemplary embodiments which can be modified in various ways by the person skilled in the art without departing from the field of the invention. For example, if other heat sources are used in addition to the energy beam, for example a panel heating system, and/or other thermally influencing variables are used, such as cooling unit etc., the energy introduced or extracted by these sources could be taken into account in the optimization. Furthermore, the use of the indefinite article "a" does not exclude the possibility that a plurality of the features in question may be present. Similarly, the term "unit" does not exclude the possibility that this unit consists of a plurality of interacting sub-components, which may also be spatially distributed, if necessary.

REFERENCE LIST 1 device for additive manufacturing/laser sintering device
2 manufactured product/object/component
3 process space/process chamber
4 chamber wall
5 container
6 container wall
7 working plane
8 build field
10 girder
11 base plate
12 build platform
13 build-up material (in container 5)
14 storage container
15 build-up material (in storage container 14)
16 coater
17 radiation heater
18 sensor arrangement/camera
20 irradiation device/exposure device
21 laser
22 impingement surface (of the laser beam)
23 deflection device/scanner
24 focusing device
25 coupling window
30 beam shaping device
31 control interface
32 beam splitter/thin-film polarizer
33 beam combiner/thin-film polarizer
34 beam shaping element/LCoS-micro-display
35 beam shaping element/LCoS-micro-display
50 control device
51 control unit
52 quality data determination device
53 irradiation control interface
54, 54' control data generating device
55 bus
56 terminal
AL (output) energy beam/laser beam
BSD control data/exposure control data
EL input energy beam/laser beam
FS focus control data
FS1, FS2 partial shape control data
H horizontal direction
HS heater control data
LS laser control data
PSD process control data
QD quality data
R beam axis/beam direction
S scan direction/movement direction of the impingement surface
SB process space sensor data set/layer image
SD scan control data
ST coating control data
TL1, TL2 partial beams
TS girder control data
V vertical direction
VS intensity distribution control data
MK material characteristic values
PZ process zones
ZG target variables
OK optimization criteria
WB secondary and/or boundary conditions
TV local temperature distribution/target temperature distribution
IO optimized intensity profile
WP further process parameters
x, y, z coordinate axes
$\Gamma_U$ environment
$\Gamma_Z$ target area
d beam expansion
$\Gamma_S$ melting zone/process zone
$\Gamma_{SA}$ active melting zone/process zone
$\Gamma_{SP}$ passive melting zone/process zone
$\Gamma_{WS}$ lateral heat-affected zone/process zone
$\Gamma_{WP}$ trailing heat-affected zone
$\Gamma_{WSA}$, $\Gamma_{WSP}$ active heat-affected zones
$\Gamma_{WPA}$, $\Gamma_{WPP}$ passive heat-affected zones

The invention claimed is:

1. A method for generating control data for a device for additive manufacturing of a manufactured product in a manufacturing process in which build-up material is built up and selectively solidified, wherein, for solidifying on a build field, irradiating of the build-up material with at least one energy beam takes place, wherein an impingement surface of the energy beam on the build field is moved in order to melt the build-up material in a target area in and around the impingement surface, the method comprising:
defining optimization criteria and/or secondary and/or boundary conditions relating to a local target temperature distribution in the target area of the build-up material for generating the control data for at least one irradiation mode, at which temperature distribution a melting of the build-up material within the target area is caused by heat conduction welding, and on the basis of the optimization criteria and/or secondary and/or boundary conditions, at least one optimized intensity profile of the energy beam is determined, wherein the optimized intensity profile of the energy beam at the impingement surface on the build field is substantially non-rotationally symmetric and is non-Gaussian shaped with respect to a beam axis running coaxially to the direction of incidence of the energy beam; and
generating the control data upon activating the device for additive manufacturing in the irradiation mode to irradiate the build-up material with an energy beam having substantially the determined optimized intensity profile.

2. The method according to claim 1, further comprising dividing the target area and an environment around the target area into process zones, wherein the spatial relative arrangement of the process zones to one another is defined with respect to a coordinate system (x, y, z) which is fixed with respect to the energy beam; and assigning different optimization criteria and/or secondary and/or boundary conditions to different process zones.

3. The method according to claim 1, wherein at least one optimization criterion relates to at least one of the following parameters:
a local temperature;
a local temperature gradient;
a cooling rate;
a power of the energy beam; and
a movement speed of the impingement surface of the energy beam on the build field.

4. The method according to claim 1, wherein the intensity profile in an area of the impingement surface on the build field has a maximum range in a direction of movement of the energy beam on the build field.

5. The method according to claim 1, wherein the impingement surface of the energy beam on the build field has a beam width of at least 400 µm.

6. The method according to claim 1, wherein in a further irradiation mode, the energy beam is generated such that melting of the build-up material within the target area is caused by deep penetration welding.

7. A method for controlling a device for additive manufacturing of a manufactured product, wherein control data for the device are generated according to the method according to claim 1 and controlling of the device is performed using these control data.

8. A non-transitory computer-readable recording medium which can be loaded directly into a storage device of a computer unit, the non-transitory computer-readable recording medium storing control data for controlling a device for additive manufacturing, the control data being configured such that the control data controls the device for additive manufacturing in such a manner that manufacturing of a manufactured product occurs using a method according to claim 7.

9. A non-transitory computer-readable recording medium which can be loaded directly into a storage device of a computer unit, the non-transitory computer-readable recording medium storing a computer program with program sections for executing all steps of the process according to claim 1 when the computer program is executed in the computer unit.

10. A method for generating control data for a device for additive manufacturing of a manufactured product in a manufacturing process in which build-up material is built up and selectively solidified, wherein, for solidifying on a build field, irradiating of the build-up material with at least one energy beam takes place, wherein an impingement surface of the energy beam on the build field is moved in order to melt the build-up material in a target area in and around the impingement surface, the method comprising:

defining optimization criteria and/or secondary and/or boundary conditions relating to a local target temperature distribution in the target area of the build-up material for generating the control data for at least one irradiation mode, at which temperature distribution a melting of the build-up material within the target area is caused by heat conduction welding, and on the basis of the optimization criteria and/or secondary and/or boundary conditions, at least one optimized intensity profile of the energy beam is determined, wherein the optimized intensity profile of the energy beam at the impingement surface on the build field is substantially non-rotationally symmetric with respect to a beam axis running coaxially to the direction of incidence of the energy beam; and generating the control data upon activating the device for additive manufacturing in the irradiation mode to irradiate the build-up material with an energy beam having substantially the determined optimized intensity profile, wherein at least one of the following process parameters is additionally determined based on the optimization criteria and/or secondary and/or boundary conditions:
radiation intensity;
at least one beam expansion and/or shape at the impingement surface of the energy beam on the build field;
movement speed of the impingement surface of the energy beam on the build field;
layer thickness; and
irradiation strategy.

11. A method for generating control data for a device for additive manufacturing of a manufactured product in a manufacturing process in which build-up material is built up and selectively solidified, wherein, for solidifying on a build field, irradiating of the build-up material with at least one energy beam takes place, wherein an impingement surface of the energy beam on the build field is moved in order to melt the build-up material in a target area in and around the impingement surface, the method comprising:

defining optimization criteria and/or secondary and/or boundary conditions relating to a local target temperature distribution in the target area of the build-up material for generating the control data for at least one irradiation mode, at which temperature distribution a melting of the build-up material within the target area is caused by heat conduction welding, and on the basis of the optimization criteria and/or secondary and/or boundary conditions, at least one optimized intensity profile of the energy beam is determined, wherein the optimized intensity profile of the energy beam at the impingement surface on the build field is substantially non-rotationally symmetric with respect to a beam axis running coaxially to the direction of incidence of the energy beam; and generating the control data upon activating the device for additive manufacturing in the irradiation mode to irradiate the build-up material with an energy beam having substantially the determined optimized intensity profile, further comprising considering at least one member from the group consisting of the following when defining the optimization criteria and/or secondary and/or boundary conditions:
characteristic values for describing phase transformations of the build-up material;
cooling rates and temperature holding points of the build-up material;
spatial temperature gradients of the build-up material;
a thermal conduction coefficient of the build-up material;
a heat capacity of the build-up material;
a density of the build-up material;
a thermal conductivity of the build-up material;
a surface tension of the build-up material;
phase transformation enthalpies of the build-up material;
boiling or evaporation temperature of the build-up material; and
a melting temperature of the build-up material.

12. A method for generating control data for a device for additive manufacturing of a manufactured product in a manufacturing process in which build-up material is built up and selectively solidified, wherein, for solidifying on a build field, irradiating of the build-up material with at least one energy beam takes place, wherein an impingement surface of the energy beam on the build field is moved in order to melt the build-up material in a target area in and around the impingement surface, the method comprising:

defining optimization criteria and/or secondary and/or boundary conditions relating to a local target temperature distribution in the target area of the build-up material for generating the control data for at least one irradiation mode, at which temperature distribution a melting of the build-up material within the target area is caused by heat conduction welding, and on the basis of the optimization criteria and/or secondary and/or boundary conditions, at least one optimized intensity profile of the energy beam is determined, wherein the optimized intensity profile of the energy beam at the impingement surface on the build field is substantially non-rotationally symmetric with respect to a beam axis running coaxially to the direction of incidence of the energy beam; and generating the control data upon activating the device for additive manufacturing in the irradiation mode to irradiate the build-up material with an energy beam having substantially the determined optimized intensity profile, wherein for defining the optimization criteria and/or secondary and/or boundary conditions relating to a local target temperature distribution at least one of the following target variables is determined:

a temporal temperature development;
a local target temperature gradient;
a target molten pool depth;
a target surface quality;
a target build rate;
a deviation from the maximum temperature; and
a target molten pool shape.

13. A method for generating control data for a device for additive manufacturing of a manufactured product in a manufacturing process in which build-up material is built up and selectively solidified, wherein, for solidifying on a build field, irradiating of the build-up material with at least one energy beam takes place, wherein an impingement surface of the energy beam on the build field is moved in order to melt the build-up material in a target area in and around the impingement surface, the method comprising:

defining optimization criteria and/or secondary and/or boundary conditions relating to a local target temperature distribution in the target area of the build-up material for generating the control data for at least one irradiation mode, at which temperature distribution a melting of the build-up material within the target area is caused by heat conduction welding, and on the basis of the optimization criteria and/or secondary and/or boundary conditions, at least one optimized intensity profile of the energy beam is determined, wherein the optimized intensity profile of the energy beam at the impingement surface on the build field is substantially non-rotationally symmetric with respect to a beam axis running coaxially to the direction of incidence of the energy beam; and generating the control data upon activating the device for additive manufacturing in the irradiation mode to irradiate the build-up material with an energy beam having substantially the determined optimized intensity profile, wherein at least one of the secondary and/or boundary conditions relates to the fulfillment of at least one of the following parameters or specifications:

a maximum temperature;
a minimum temperature;
a continuous temperature profile at a boundary between two adjacent process zones; and
a minimum meltpool depth.

14. A control data generating device for generating control data for a device for additive manufacturing of a manufactured product in a manufacturing process in which build-up material is built up and selectively solidified, wherein, for solidifying on a build field, irradiating the build-up material with at least one energy beam takes place, wherein an impingement surface of the energy beam on the build field is moved in order to melt the build-up material in a target area in and around the impingement surface, the device comprising:

a defining module for defining optimization criteria and/or secondary and/or boundary conditions relating to a local target temperature distribution in the target area of the build-up material for generating the control data for at least one irradiation mode, at which temperature distribution a melting of the build-up material within the target area is caused by heat conduction welding, and on the basis of the optimization criteria and/or secondary and/or boundary conditions, at least one optimized intensity profile of the energy beam is determined, wherein the optimized intensity profile of the energy beam at the impingement surface on the build field is substantially non-rotationally symmetric and is non-Gaussian shaped with respect to a beam axis running coaxially to the direction of incidence of the energy beam; and a control data generating module for generating the control data upon activating the device for additive manufacturing in the irradiation mode to irradiate the build-up material with an energy beam having substantially the determined optimized intensity profile.

15. A control device for a device for additive manufacturing of a manufactured product in a manufacturing process in which build-up material is built up and selectively solidified, wherein, for solidifying on a build field, irradiating the build-up material with at least one energy beam occurs, wherein an impingement surface of the energy beam on the build field is moved in order to melt the build-up material in a target area in and around the impingement surface, wherein the control device comprises a control data generating device according to claim 14 or an interface to the control data generating device for providing the control data and is designed to control the device for irradiating the build-up material with the energy beam using the control data.

16. A device for additive manufacturing of manufactured products in an additive manufacturing process, having at least one feed device for introducing build-up material into a process space, at least one irradiation device for selectively solidifying the build-up material by irradiating by means of an energy beam, and at least one control device according to claim 15.

* * * * *